US012741199B2

(12) United States Patent
Yamagiwa et al.

(10) Patent No.: US 12,741,199 B2
(45) Date of Patent: Sep. 22, 2026

(54) PROGRAM, INFORMATION PROCESSING DEVICE, AND INFORMATION PROCESSING METHOD

(71) Applicant: The Pokémon Company, Tokyo (JP)

(72) Inventors: Junichi Yamagiwa, Tokyo (JP); Marina Ohnaro, Tokyo (JP)

(73) Assignee: THE POKÉMON COMPANY, Tokyo (JP)

( * ) Notice: Subject to any disclaimer, the term of this patent is extended or adjusted under 35 U.S.C. 154(b) by 298 days.

(21) Appl. No.: 18/418,541

(22) Filed: Jan. 22, 2024

(65) Prior Publication Data

US 2024/0216797 A1 Jul. 4, 2024

Related U.S. Application Data

(63) Continuation of application No. PCT/JP2022/020766, filed on May 19, 2022.

(30) Foreign Application Priority Data

Jul. 26, 2021 (JP) ................................ 2021-121158

(51) Int. Cl.
*A63F 13/335* (2014.01)

(52) U.S. Cl.
CPC ................................ *A63F 13/335* (2014.09)

(58) Field of Classification Search
None
See application file for complete search history.

(56) References Cited

U.S. PATENT DOCUMENTS

2012/0064969 A1* 3/2012 Uchibori .............. A63F 13/335 463/43
2014/0221062 A1* 8/2014 Shinoda ............... A63F 13/847 463/6
2019/0228552 A1* 7/2019 Lee ...................... G06F 40/279
2019/0259066 A1 8/2019 Asukai
2021/0329982 A1* 10/2021 Yamagiwa ............ G06V 40/16

FOREIGN PATENT DOCUMENTS

| | | | |
|---|---|---|---|
| JP | 6404504 | B2 | 10/2018 |
| JP | 6434184 | B1 | 12/2018 |
| JP | 6667878 | B1 | 3/2020 |
| JP | 6740431 | B1 | 8/2020 |
| JP | 2020-192387 | A | 12/2020 |
| WO | 2018/087968 | A1 | 5/2018 |

OTHER PUBLICATIONS

International Search Report and Written Opinion mailed on Aug. 2, 2022, received for PCT Application PCT/JP2022/020766, filed on May 19, 2022, 10 pages including English Translation.
English Translation of Written Opinion of the International Searching Authority issued on Aug. 2, 2022 in corresponding International Patent Application No. PCT/JP2022/020766, 5 pages.

* cited by examiner

*Primary Examiner* — Ronald Laneau
(74) *Attorney, Agent, or Firm* — XSENSUS LLP

(57) ABSTRACT

A method for outputting different performances by different types of kigurumi includes acquiring first identification information from a terminal provided on a kigurumi, acquiring first user identification information from a first user terminal, and a outputting performance information relating to the kigurumi based on the first identification information and the first user identification information, and a different value is set as the first identification information for each type of kigurumi or each individual kigurumi.

18 Claims, 17 Drawing Sheets

SERVER
10
1
11
PROCESSOR
12
MAIN STORAGE DEVICE
13
AUXILIARY STORAGE DEVICE
19
COMMUNICATION BUS
14
COMMUNICATION IF
N
USER TERMINAL
20A
USER TERMINAL
20B
USER TERMINAL
20C
32A
33A
30A
40A
32B
33B
30B
40B
32C
33C
30C
40C

Fig. 7

| IDENTIFICATION INFORMATION DATABASE | | | | |
|---|---|---|---|---|
| IDENTIFICATION INFORMATION | INDIVIDUAL CODE | NOTIFICATION PERMISSION | TYPE CODE | RARITY |
| 0010 0100 | BEAR-001 | TRUE | CDBEAR | B |
| 0010 0110 | BEAR-002 | FALSE | | |
| 0010 0001 | BEAR-003 | TRUE | | |
| 0010 1000 | RABBIT-001 | TRUE | CDRABBIT | C |
| 1010 0100 | RABBIT-002 | TRUE | | |
| 0100 0100 | RABBIT-003 | FALSE | | |
| 0011 0100 | FISH-001 | TRUE | CDFISH | D |
| 0010 1100 | FISH-002 | TRUE | | |
| 0010 1110 | FISH-003 | TRUE | | |
| ・・・ | ・・・ | ・・・ | ・・・ | ・・・ |

Fig. 8A

| USER INFORMATION DATABASE | | |
|---|---|---|
| USER ID | LOCATION INFORMATION | FRIEND ID |
| USER1 | Q | USER2 |
| | | USER4 |
| | | USER5 |
| USER2 | R | USER1 |
| | | USER8 |
| USER3 | S | USER9 |
| USER4 | T | USER1 |
| . . . | . . . | . . . |

Fig. 8B

| DECK DATABASE | | | |
|---|---|---|---|
| USER ID | CHARACTER CODE | TYPE CODE | CHARACTER ATTRIBUTE |
| USER1 | Bear | CDBEAR | GROUND |
| | Rabbit | CDRABBIT | POWER |
| USER2 | Bear | CDBEAR | GROUND |
| | Fish | CDFISH | WATER |
| . . . | . . . | | . . . |

Fig. 8C

| LOG INFORMATION DATABASE | | | | | |
|---|---|---|---|---|---|
| USER ID | TYPE CODE | INDIVIDUAL CODE | LOG INFORMATION | | |
| | | | IDENTIFICATION TIME AND DATE | IDENTIFICATION ORDER | NUMBER OF ACQUISITIONS |
| USER1 | CDRABBIT | RABBIT-003 | 2018-09-03 18:29:38 | 1 | 2 |
| | CDRABBIT | RABBIT-003 | 2018-09-28 17:09:31 | 2 | |
| | CDBEAR | BEAR-001 | 2018-10-06 15:45:07 | 3 | 4 |
| | CDBEAR | BEAR-001 | 2018-10-31 12:27:34 | 4 | |
| | CDBEAR | BEAR-001 | 2018-11-04 19:09:04 | 5 | |
| | CDBEAR | BEAR-002 | 2018-11-16 11:31:57 | 6 | |
| . . . | . . . | . . . | . . . | . . . | . . . |

Fig. 9

| INDIVIDUAL PERFORMANCE DATABASE | | |
|---|---|---|
| INDIVIDUAL CODE | PERFORMANCE CONTENT A (USER TERMINAL) | PERFORMANCE CONTENT B (KIGURUMI TERMINAL) |
| BEAR-001 | DISPLAY IMAGE: BEAR-001<br>MESSAGE: NICE TO MEET YOU | LED COLOR: PINK<br>FLASHING PATTERN: A<br>EFFECT SOUND: A<br>KIGURUMI ACTION: A |
| BEAR-002 | DISPLAY IMAGE: BEAR-002<br>MESSAGE: NICE TO MEET YOU | LED COLOR: PINK<br>FLASHING PATTERN: A<br>EFFECT SOUND: A<br>KIGURUMI ACTION: A |
| BEAR-003 | DISPLAY IMAGE: BEAR-003<br>MESSAGE: NICE TO MEET YOU | LED COLOR: PINK<br>FLASHING PATTERN: A<br>EFFECT SOUND: A<br>KIGURUMI ACTION: A |
| RABBIT-001 | DISPLAY IMAGE: RABBIT-001<br>MESSAGE: NICE TO MEET YOU | LED COLOR: RED<br>FLASHING PATTERN: A<br>EFFECT SOUND: A<br>KIGURUMI ACTION: A |
| RABBIT-002 | DISPLAY IMAGE: RABBIT-002<br>MESSAGE: NICE TO MEET YOU | LED COLOR: RED<br>FLASHING PATTERN: A<br>EFFECT SOUND: A<br>KIGURUMI ACTION: A |
| RABBIT-003 | DISPLAY IMAGE: RABBIT-003<br>MESSAGE: NICE TO MEET YOU | LED COLOR: RED<br>FLASHING PATTERN: A<br>EFFECT SOUND: A<br>KIGURUMI ACTION: A |
| FISH-001 | DISPLAY IMAGE: FISH-001<br>MESSAGE: NICE TO MEET YOU | LED COLOR: BLUE<br>FLASHING PATTERN: A<br>EFFECT SOUND: A<br>KIGURUMI ACTION: A |
| FISH-002 | DISPLAY IMAGE: FISH-002<br>MESSAGE: NICE TO MEET YOU | LED COLOR: BLUE<br>FLASHING PATTERN: A<br>EFFECT SOUND: A<br>KIGURUMI ACTION: A |
| FISH-003 | DISPLAY IMAGE: FISH-003<br>MESSAGE: NICE TO MEET YOU | LED COLOR: BLUE<br>FLASHING PATTERN: A<br>EFFECT SOUND: A<br>KIGURUMI ACTION: A |
| . . . | . . . | . . . |

Fig. 10A

| REPEAT ADDITIONAL PERFORMANCE DATABASE | | |
|---|---|---|
| NUMBER OF ACQUISITIONS | REPEAT ADDITIONAL PERFORMANCE A | REPEAT ADDITIONAL PERFORMANCE B |
| 2 | MESSAGE: THANKS AGAIN! SEE YOU SOON!<br>BACKGROUND EFFECT: A | FLASHING PATTERN: B<br>EFFECT SOUND: B<br>VOICE: B |
| 4 | MESSAGE: THANKS AGAIN! SEE YOU SOON!<br>BACKGROUND EFFECT: A | FLASHING PATTERN: C<br>EFFECT SOUND: C<br>VOICE: C |
| . . . | . . . | . . . |

Fig. 10B

| RARE ADDITIONAL PERFORMANCE DATABASE | | | |
|---|---|---|---|
| INDIVIDUAL CODE | RARITY | RARE ADDITIONAL PERFORMANCE A | RARE ADDITIONAL PERFORMANCE B |
| BEAR-002 | S | BACKGROUND EFFECT: B | FLASHING PATTERN: D<br>KIGURUMI ACTION: PATTERN D |
| RABBIT-002 | A | CHARACTER EFFECT: A | FLASHING PATTERN: E<br>KIGURUMI ACTION: PATTERN E |
| FISH-001 | S+ | ANIMATION: A | FLASHING PATTERN: F<br>KIGURUMI ACTION: PATTERN F |
| . . . | . . . | . . . | . . . |

Fig. 10C

| ATTRIBUTE PERFORMANCE DATABASE | | | |
|---|---|---|---|
| TYPE CODE | ATTRIBUTE INFORMATION | ATTRIBUTE PERFORMANCE A | ATTRIBUTE PERFORMANCE B |
| CDBEAR | GROUND | BACKGROUND EFFECT: G | LED COLOR: BROWN<br>FLASHING PATTERN: G<br>EFFECT SOUND: G<br>VOICE: G |
| CDRABBIT | POWER | BACKGROUND EFFECT: H | LED COLOR: RED<br>FLASHING PATTERN: H<br>EFFECT SOUND: H<br>VOICE: H |
| CDFISH | WATER | BACKGROUND EFFECT: I | LED COLOR: LIGHT BLUE<br>FLASHING PATTERN: I<br>EFFECT SOUND: I<br>VOICE: I |
| . . . | . . . | . . . | . . . |

Fig. 10D

| ATTRIBUTE ADDITIONAL PERFORMANCE DATABASE | | | |
|---|---|---|---|
| KIGURUMI ATTRIBUTE | USER ATTRIBUTE | ATTRIBUTE ADDITIONAL PERFORMANCE A | ATTRIBUTE ADDITIONAL PERFORMANCE B |
| GROUND | FLYING | BACKGROUND EFFECT: J | VOICE: J<br>KIGURUMI ACTION: J |
| FIRE | WATER | BACKGROUND EFFECT: K | VOICE: K<br>KIGURUMI ACTION: K |
| WATER | POWER | BACKGROUND EFFECT: L | VOICE: L<br>KIGURUMI ACTION: L |
| . . . | . . . | . . . | . . . |

Fig. 11A

| GAME CONTROL DATABASE | | | | |
|---|---|---|---|---|
| TYPE CODE | CHARACTER CODE | ATTRIBUTE INFO | CONTROL CONTENT A (CHARACTER) | CONTROL CONTENT B (QUEST) |
| CDBEAR | Bear | GROUND | ACQUIRED CHARACTER: Bear<br>PARAMETER CONTROL: Bear ATTACK POWER + 4 (6 HOURS) | QUEST UNLOCKED: BEAR'S CAVE (LV1)<br>REWARD INCREASE: DEFEAT WOLF (2x) |
| CDRABBIT | Rabbit | POWER | ACQUIRED CHARACTER: Rabbit<br>PARAMETER CONTROL: Rabbit SPEED + 4 (6 HOURS) | QUEST UNLOCKED: RABBIT'S MEADOW (LV1)<br>REWARD INCREASE: TIGER DEFENSE (2x) |
| CDFISH | Fish | WATER | ACQUIRED CHARACTER: Fish<br>PARAMETER CONTROL: Fish DEFENSE + 4 (6 HOURS) | QUEST UNLOCKED: FISH'S DEEP SEA (LV1)<br>REWARD INCREASE: DEFEAT WOLF (2x) |
| . . . | . . . | . . . | . . . | . . . |

Fig. 11B

| REPEAT ADDITIONAL CONTROL DATABASE | | |
|---|---|---|
| NUMBER OF ACQUISITIONS | REPEAT ADDITIONAL CONTROL A | REPEAT ADDITIONAL CONTROL B |
| 2 | PARAMETER CONTROL: 2x | QUEST UNLOCKED: LV2<br>REWARD INCREASE: 4x |
| 4 | PARAMETER CONTROL: 4x | QUEST UNLOCKED: LV3<br>REWARD INCREASE: 8x |

Fig. 11C

| ATTRIBUTE ADDITIONAL CONTROL DATABASE | | | |
|---|---|---|---|
| KIGURUMI ATTRIBUTE | USER ATTRIBUTE | ATTRIBUTE ADDITIONAL CONTROL A | ATTRIBUTE ADDITIONAL CONTROL B |
| GROUND | FLYING | PARAMETER CONTROL: 1.5x<br>ADDITIONAL ATTRIBUTE: WATER | |
| FIRE | WATER | PARAMETER CONTROL: 1.5x<br>ADDITIONAL ATTRIBUTE: GROUND | |
| WATER | POWER | PARAMETER CONTROL: 1.5x<br>ADDITIONAL ATTRIBUTE: FIRE | |
| | . . . | . . . | . . . |

70
72
NICE TO MEET YOU
71
BEAR (RARITY B)

70
72
THANKS AGAIN! SEE YOU SOON!
73
71
BEAR (RARITY B)

70
72
74
NICE TO MEET YOU
71
BEAR (RARITY B)

70
72
NICE TO MEET YOU
73
71
BEAR (RARITY A)

70
72
NICE TO MEET YOU
73
71
BEAR (RARITY B)

70
72
NICE TO MEET YOU
73
71
BEAR (RARITY B)

70
USER1 IS WITH THE BEAR AT AN EVENT!
76
CLOSE

70
A BEAR MEETING EVENT IS TAKING PLACE NEARBY
76
CLOSE

Fig. 16A
Fig. 16B
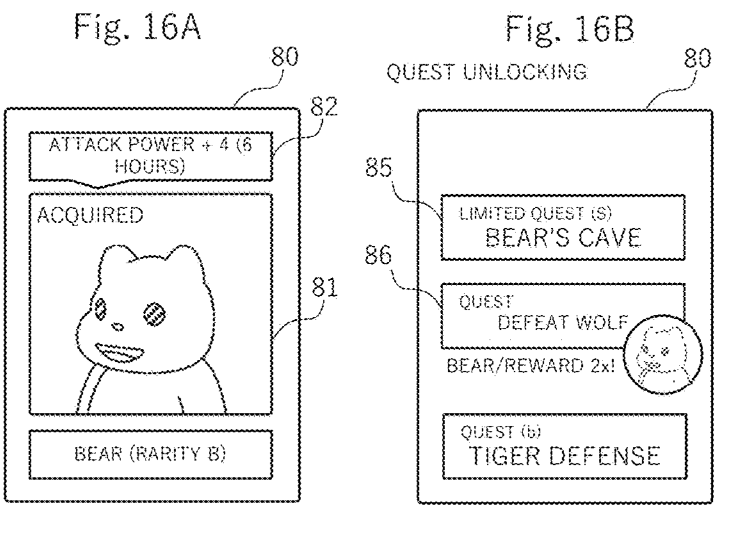
Fig. 16C
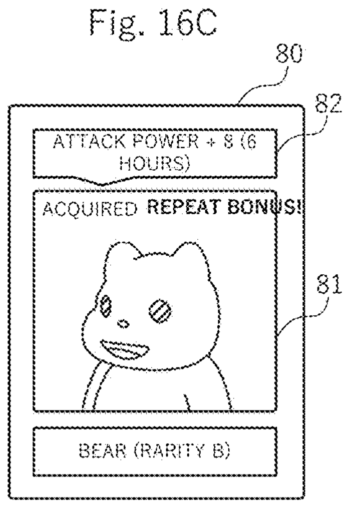
Fig. 16D
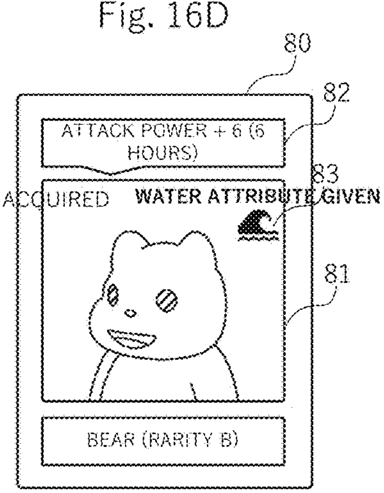
Fig. 16E
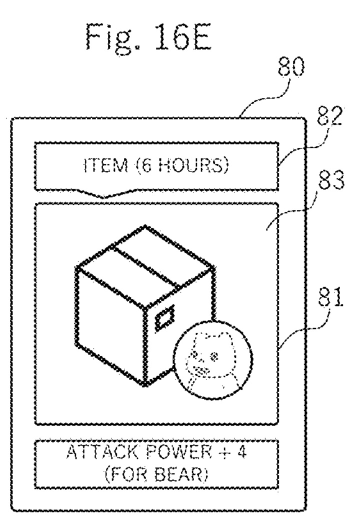

PROGRAM, INFORMATION PROCESSING DEVICE, AND INFORMATION PROCESSING METHOD

CROSS-REFERENCE TO RELATED APPLICATIONS

This application is a continuation of International Application No. PCT/JP2022/020766, filed May 19, 2022, which claims priority to JP 2021-121158, filed Jul. 26, 2021, the entire contents of each are incorporated herein by reference.

BACKGROUND

Technical Field

The present disclosure relates to a program, an information processing device, and an information processing method.

Description of the Related Art

Kigurumi is a general term for life-sized plush toys that cover the entire body of a person and are made using special clothing, materials, and so on. Performances in which a person (a performer) climbs inside the kigurumi and changes their appearance by covering their entire body in special clothing representing an anthropomorphic animal or monster or an imaginary creature (a character) are often used at various events and amusement parks, on television programs, and so on. PTL 1 discloses a kigurumi simulating a mascot character. PTL 2 discloses a kigurumi performance assistance device that outputs a kigurumi performance corresponding to the surrounding situation. PTL 3 discloses a communication device capable of transmitting request information to users surrounding a kigurumi in accordance with the atmosphere of the surrounding users.

CITATION LIST

Patent Literature

[PTL 1] Japanese Patent No. 6434184

[PTL 2] Japanese Patent No. 6667878

[PTL 3] Republished International Patent Publication No. 2018/087968

SUMMARY

Technical Problems

During an event in which a plurality of kigurumis participate, a user may interact with a plurality of kigurumis. In this case, it is uninteresting for the user if all of the kigurumis produce similar performances. This leads to a problem in that it is impossible to provide the user with a sufficient sense of attachment to a character through interaction with a kigurumi and sufficient surprises while participating in an event.

Hence, the present disclosure has been designed to solve this problem, and an object thereof is to provide a program, an information processing device, and an information processing method with which different performances are output by different types of kigurumis or different individual kigurumis, thereby providing a user with more interesting experiential services.

Solutions to Problems

A program that is executed on a computer having a processor and a storage unit, wherein the program causes the processor to execute a first step for acquiring first identification information corresponding to a kigurumi, a second step for acquiring first user identification information corresponding to a first user terminal, and a third step for outputting performance information relating to the kigurumi on the basis of a combination of the first identification information and the first user identification information, and a different value can be set as the first identification information for each of a plurality of kigurumis.

Advantageous Effects

According to the present disclosure, different performances can be output by different types of kigurumis or different individual kigurumis.

BRIEF DESCRIPTION OF DRAWINGS

FIG. 7 is a diagram illustrating a data structure of an identification information database.

FIG. 8A is a diagram illustrating a data structure of a user information database 1012, FIG. 8B is a diagram illustrating a data structure of a deck database, and FIG. 8C is a diagram illustrating a data structure of a log information database.

FIG. 9 is a diagram illustrating a data structure of an individual performance database.

FIG. 10A is a diagram illustrating a data structure of a repeat additional performance database, FIG. 10B is a diagram illustrating a data structure of a rare additional performance database, FIG. 10C is a diagram illustrating a data structure of an attribute performance database, and FIG. 10D is a diagram illustrating a data structure of an attribute additional performance database.

FIG. 11A is a diagram illustrating a data structure of a game control database, FIG. 11B is a diagram illustrating a data structure of a repeat additional control database, and FIG. 11C is a diagram illustrating a data structure of an attribute additional control database.

FIG. 16A is a diagram illustrating an example of a display screen corresponding to control content A, FIG. 16B is a diagram illustrating an example of a display screen corresponding to control content B, FIG. 16C is a diagram illustrating an example of a display screen corresponding to repeat additional control A, and FIG. 16D is a diagram illustrating an example of a display screen corresponding to attribute additional control A on the user terminal, and FIG. 16E is a diagram illustrating an example of a display screen corresponding to an item.

DETAILED DESCRIPTION

Hereinafter, embodiments of the present disclosure will be described with reference to the drawings. In all of the diagrams illustrating the embodiments, common components will be denoted by same reference signs and repetitive descriptions will be omitted. It is to be understood that the following embodiments do not unduly restrict the content of the present disclosure as set forth in the scope of claims. In addition, not all components described in the embodiment are essential components of the present disclosure. It is also to be understood that the respective drawings are schematic views and are not necessarily strict illustrations.

<Overview of Information Processing System 1>

Figure 1:
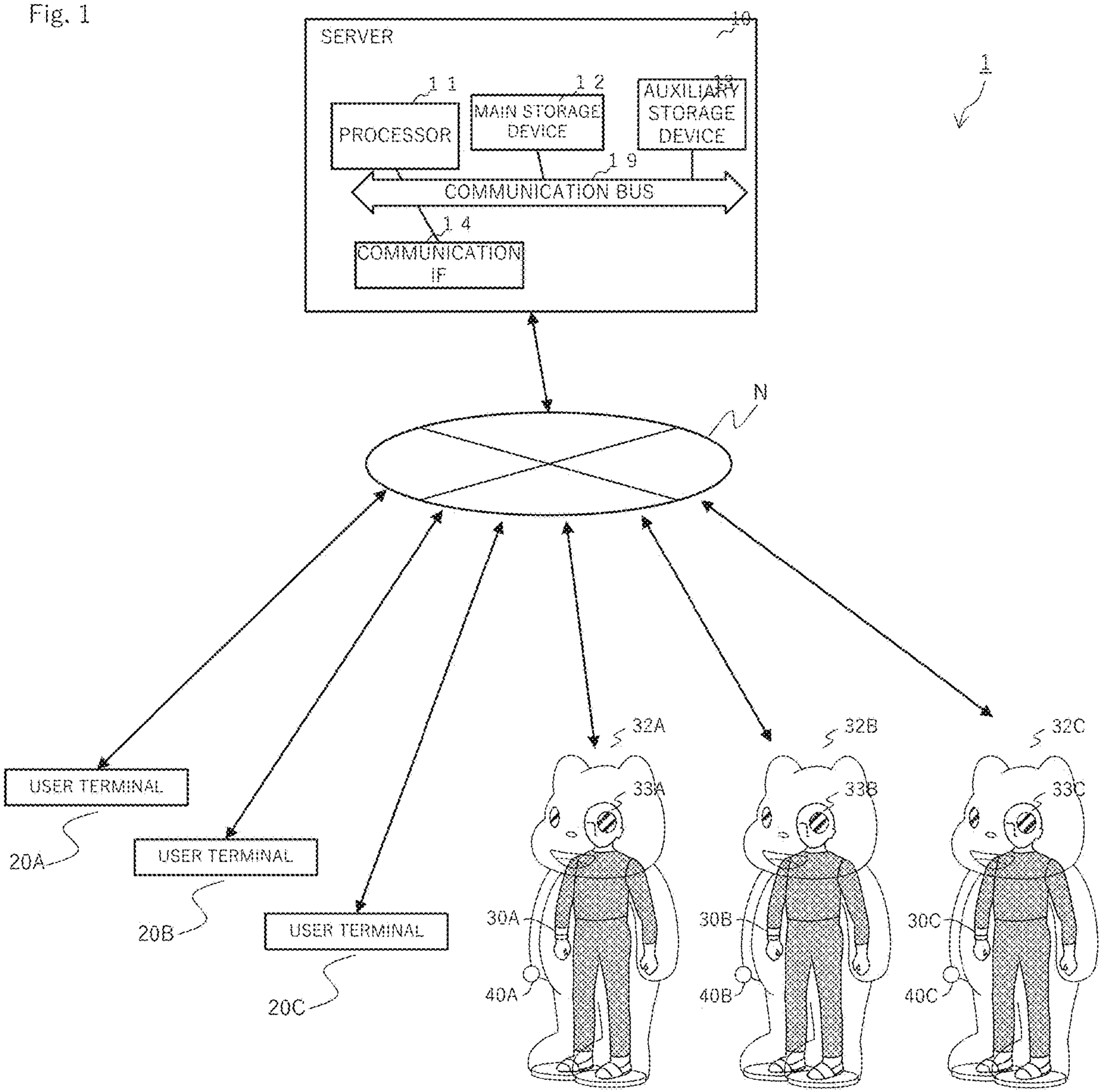
FIG. 1 is a diagram illustrating an overall configuration of an information processing system.

FIG. 1 is a diagram illustrating an overall configuration of an information processing system 1. The information processing system 1 according to the present disclosure is an information processing system in which different performances are output by different types of kigurumis or different individual kigurumis at an event in which a plurality of kigurumis participate.

<Basic Configuration of Information Processing System 1>

Figure 2:
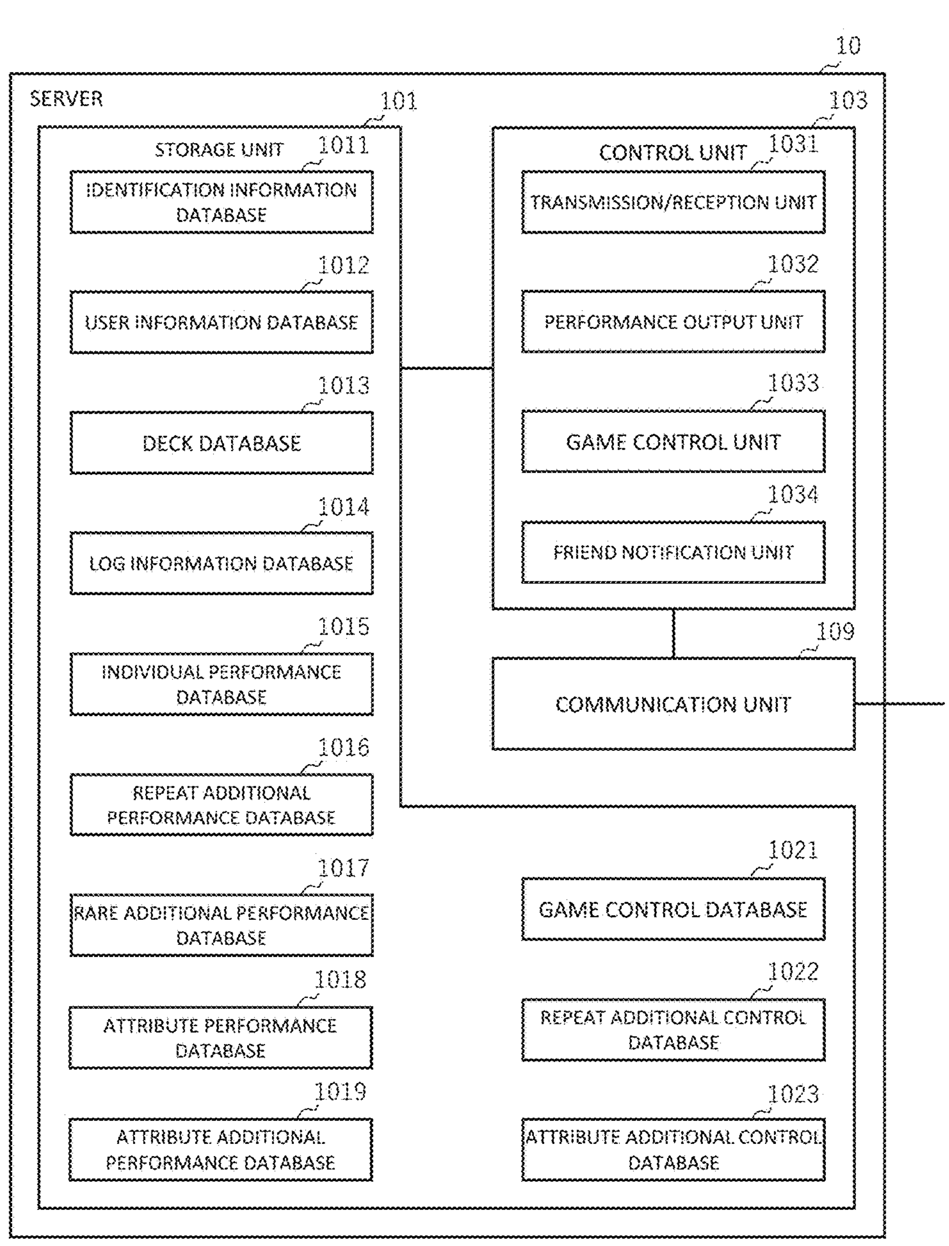
FIG. 2 is a block diagram illustrating a functional configuration of a server.
Figure 3:
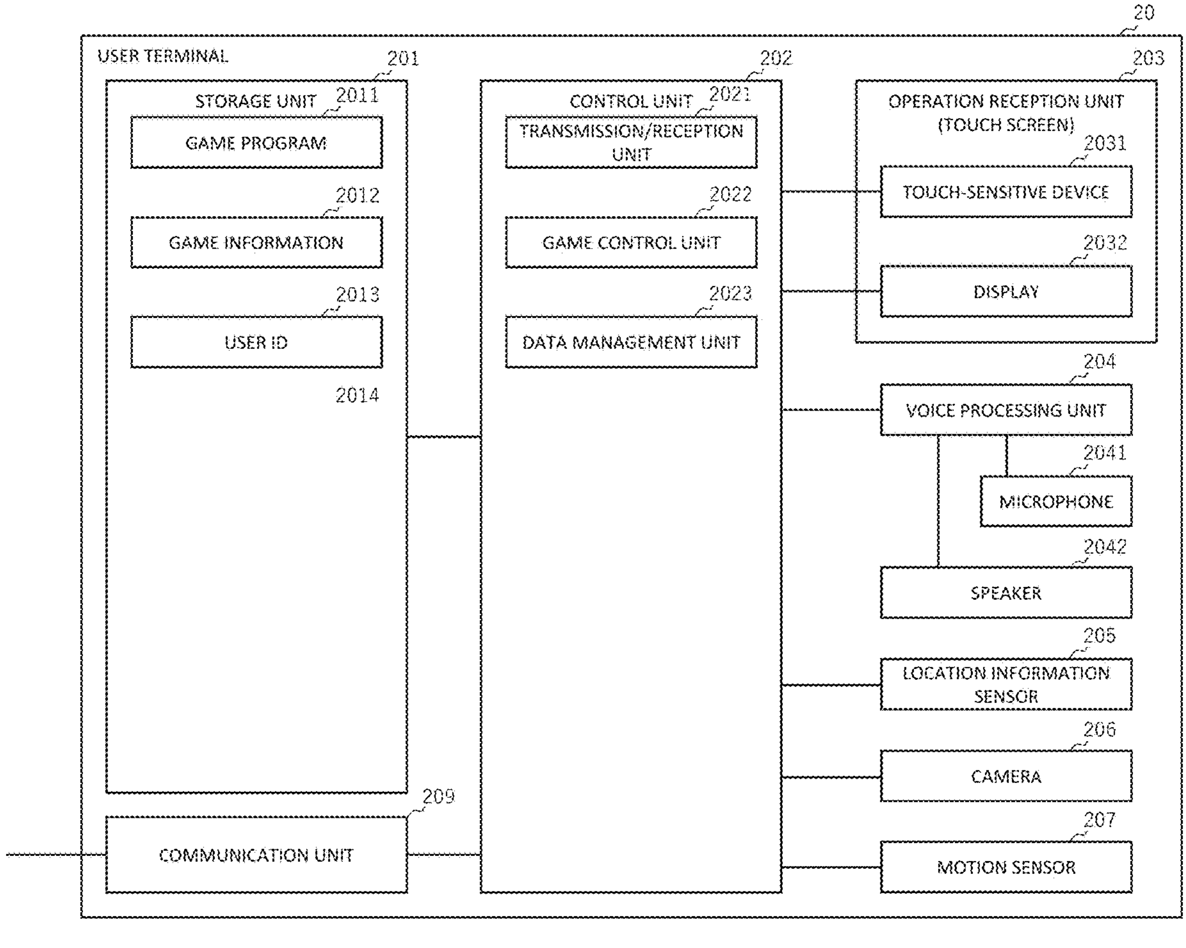
FIG. 3 is a block diagram illustrating a hardware configuration of a user terminal.
Figure 4:
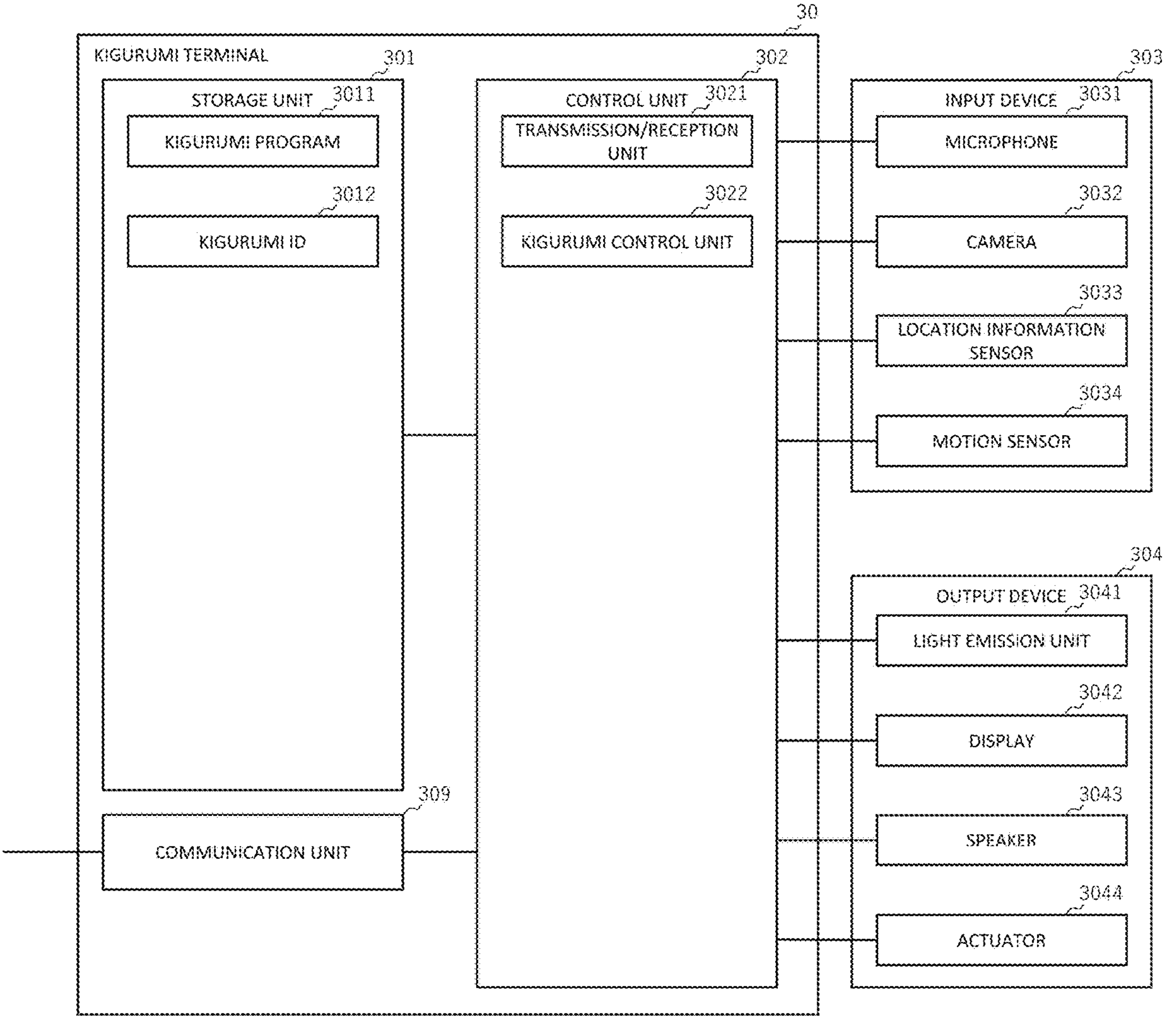
FIG. 4 is a block diagram illustrating a hardware configuration of a kigurumi terminal.
Figure 5A:
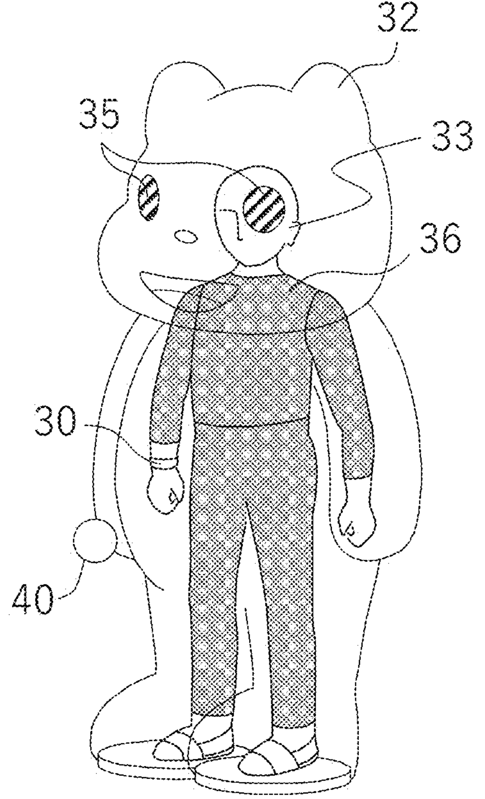
FIGS. 5A and 5B are schematic diagrams illustrating a kigurumi.
Figure 5B:
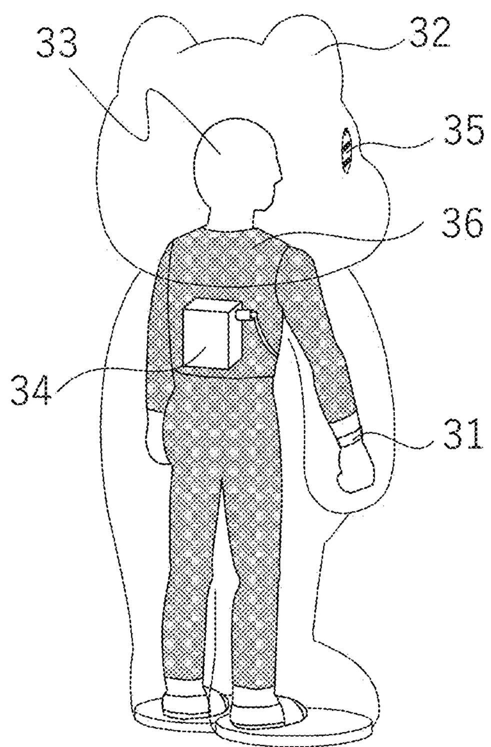
Figure 6A:
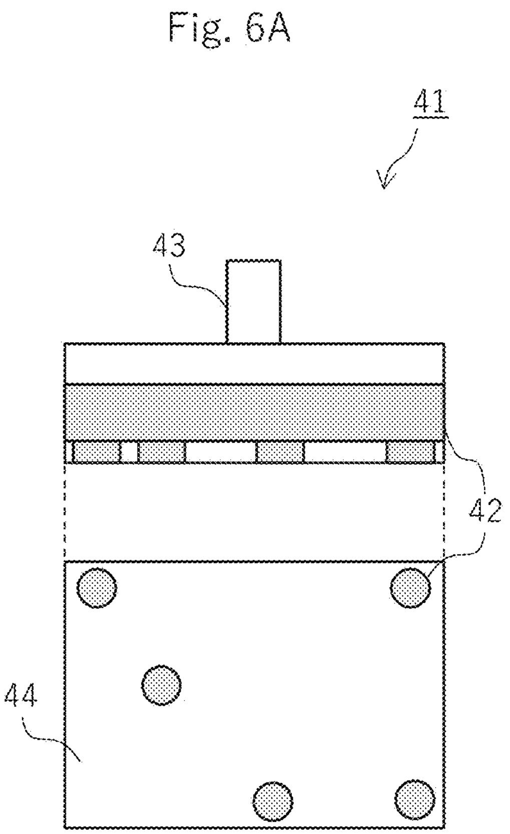
FIG. 6A is a diagram illustrating a configuration of a stamp.
Figure 6B:
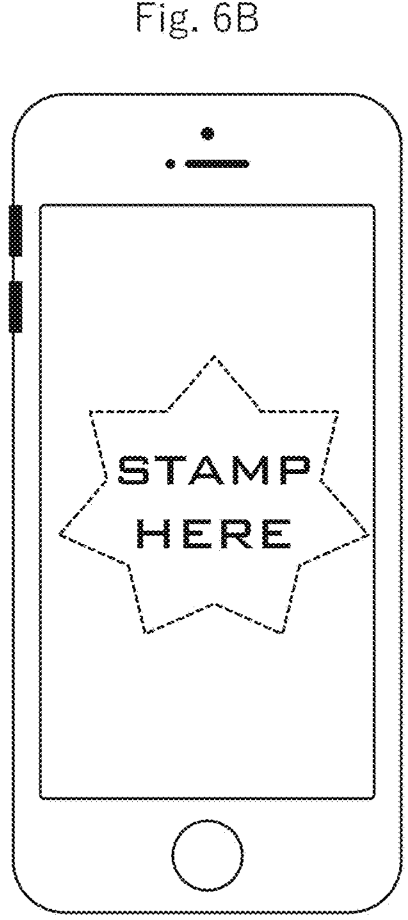
FIG. 6B is a diagram illustrating a stamping screen.

FIG. 1 shows the information processing system 1 according to the present disclosure. The information processing system 1 is configured to include a server 10, a plurality of user terminals 20A, 20B, 20C, and kigurumi terminals 30A, 30B, 30C attached to a plurality of kigurumis, these components being connected to each other through a network N. FIG. 2 is a block diagram illustrating a functional configuration of the server 10. FIG. 3 is a block diagram illustrating a hardware configuration of the user terminal 20. FIG. 4 is a block diagram illustrating a hardware configuration of the kigurumi terminal 30. FIGS. 5A and 5B are schematic diagrams illustrating a kigurumi 32. FIGS. 6A and 6B are diagrams illustrating a configuration of a stamp 41.

The server 10 is an information processing device that provides a performance service at an event in which kigurumis participate. The user terminal 20 is an information processing device operated by a participating user (the user hereinafter) who receives the performance service at the event. The kigurumi terminal 30 is an information processing device operated by a performer 33 wearing the kigurumi 32.

Each of the information processing devices is constituted by a computer equipped with a calculation device and a storage device. A basic hardware configuration of the computer and a basic functional configuration of the computer, which is realized by the hardware configuration, will be described below. With regard to the server 10, the user terminal 20, and the kigurumi terminal 30, repetitive description of the basic hardware configuration of the computer and the basic functional configuration of the computer, as described below, has been omitted.

The configurations and operations of the respective devices are described below.

<Overview of Server 10>

The server 10 is an information processing device operated by a service provider that provides a performance service at an event in which a kigurumi participates. The server 10 is a computer that detects interaction between the kigurumi and the user and outputs performance content to the user terminal and the kigurumi terminal.

<Functional Configuration of Server 10>

FIG. 2 shows a functional configuration realized by the hardware configuration of the server 10.

<Configuration of Storage Unit of Server 10>

A storage unit 101 of the server 10 includes an identification information database 1011, a user information database 1012, a deck database 1013, a log information database 1014, an individual performance database 1015, a repeat additional performance database 1016, a rare additional performance database 1017, an attribute performance database 1018, an attribute additional performance database 1019, a game control database 1021, a repeat additional control database 1022, and an attribute additional control database 1023.

Note that the databases may be provided so as to be distributed among a plurality of servers. Alternatively, some of the databases may be provided so as to be distributed between the user terminal 20 and the kigurumi terminal 30, and as long as the functions of the storage unit can be realized as a system, any configuration may be employed.

FIG. 7 is a diagram illustrating a data structure of the identification information database 1011. The identification information database 1011 is a database that uses identification information as a key and includes columns for individual code, notification permission, type code, and rarity.

The identification information is an item specifying an identification device 40, and a different value is stored therein for each type of kigurumi 32 or each individual kigurumi 32. The identification information may include information specifying the performer of the kigurumi 32. The individual code is an item for specifying the individual kigurumi 32, and a different value is stored therein for each set of identification information. As the notification permission, setting information (notification permission information) indicating whether or not a friend user associated with the user or peripheral users can be notified of information about the interaction between the kigurumi 32 and the user. When the value of the notification permission is TRUE, notification is performed, and when the value of the notification permission is FALSE, notification is not performed. The type code is an item for specifying the type of the kigurumi 32, and a different value is stored therein for each type of kigurumi 32. It is assumed that kigurumis 32 having the same type code are formed to have substantially identically shaped appearances. Note, however, that even though kigurumis 32 having the same type code have substantially identically shaped appearances, the kigurumis 32 have different individual codes, and therefore each individual kigurumi 32 can provide a different performance service to the user. The rarity is an item indicating the rarity of the kigurumi 32, and the same value is stored therein for the same type of kigurumi 32. Note that rarity information for each individual of each type of kigurumi 32 is stored in the rare additional performance database 1017.

FIG. 8A is a diagram illustrating a data structure of the user information database 1012. The user information database 1012 is a database that uses a user ID as a key and includes columns for location information and friend ID.

The location information is an item indicating the location of the user terminal 20. Location information indicating a longitude and a latitude, which are detection values acquired by a location information sensor provided in the user terminal 20, is acquired periodically from the user terminal 20 and stored as the location information. The friend ID is an item indicating the user ID of a friend of the user. The user can add and delete friend IDs by performing a predetermined friend operation on the user terminal 20.

FIG. 8B is a diagram illustrating a data structure of the deck database 1013. The deck database 1013 is a database that uses the user ID as a key and includes columns for character code, type code, and character attribute.

The character code is an item indicating an in-game character held by the user. A character code is stored as the character code. The type code is an item for identifying the type of the character stored in the character code, and the same code as the type code of the kigurumi 32 is stored as the type code. The character codes of the in-game characters and the types of the kigurumis 32 are associated with each other through the deck database 1013. The character attribute is an item indicating an in-game attribute for each character stored in the character code. The in-game attribute is information prescribing the compatibility between characters and the compatibility between the characters and the in-game environment as the game progresses, and by making the progress of the game advantageous or disadvantageous according to compatibility combinations, the game is made more interesting.

FIG. 8C is a diagram illustrating a data structure of the log information database 1014. The log information database 1014 is a database that uses the user ID as a key and includes columns for type code, individual code, and log information (identification time and date, identification order, and number of acquisitions). A history of acquisition by the user terminal 20 of identification information from the identification device 40 is stored in the log information database 1014 for each user ID.

The type code and the individual code of the kigurumi 32 relating to the acquired identification information are stored as the type code and the individual code. The identification time and date is an item in which the time and date on which the identification information was acquired is stored. The identification order is an item in which the acquisition order of the identification information is stored. More specifically, the identification order is incremented and stored each time identification information is acquired. The number of acquisitions is an item in which the number of times the identification information has been acquired is aggregated and stored for each type code.

FIG. 9 is a diagram illustrating a data structure of the individual performance database 1015. The individual performance database 1015 is a database that uses the individual code as a key and includes columns for performance content A and performance content B.

The performance content A is an item in which performance information used to produce a performance on the user terminal 20 is stored for each individual kigurumi 32. For example, the performance information stored in the performance content A is an object (an instance) of a "user terminal performance class", having properties such as "display image", "message", "character effect", "background effect", and "animation".

The performance content B is an item in which performance information used to produce a performance on the kigurumi terminal 30 is stored for each individual kigurumi 32. For example, the performance information stored in the performance content B is an object (an instance) of a "kigurumi terminal performance class", having properties such as "LED color", "flashing pattern", "effect sound", "voice", and "kigurumi action".

FIG. 10A is a diagram illustrating a data structure of the repeat additional performance database 1016. The repeat additional performance database 1016 is a database that uses the number of acquisitions as a key and includes columns for repeat additional performance A and repeat additional performance B. Additional performance content displayed on the user terminal 20 in accordance with the number of acquisitions for each individual kigurumi 32 is stored in the repeat additional performance database 1016.

The repeat additional performance A is an item in which performance information used to produce an additional performance on the user terminal 20 in accordance with the number of acquisitions is stored for each individual kigurumi 32. For example, an object of the user terminal performance class is stored in the repeat additional performance A. The repeat additional performance B is an item in which performance information used to produce an additional performance on the kigurumi terminal 30 in accordance with the number of acquisitions is stored for each individual kigurumi 32. For example, an object of the kigurumi terminal performance class is stored in the repeat additional performance B.

FIG. 10B is a diagram illustrating a data structure of the rare additional performance database 1017. The rare additional performance database 1017 is a database that uses the individual code as a key and includes columns for rarity, rare additional performance A, and rare additional performance B. A rarity and additional performance content are stored in the rare additional performance database 1017 for each individual kigurumi 32.

The rare additional performance A is an item in which performance information used to produce an additional performance on the user terminal 20 in accordance with the rarity of each individual kigurumi 32 is stored. For example, an object of the user terminal performance class is stored in the rare additional performance A.

The rare additional performance B is an item in which performance information used to produce an additional performance on the kigurumi terminal 30 in accordance with the rarity of each individual kigurumi 32 is stored. For example, an object of the kigurumi terminal performance class is stored in the rare additional performance B.

FIG. 10C is a diagram illustrating a data structure of the attribute performance database 1018. The attribute performance database 1018 is a database that uses the type code as a key and includes columns for attribute information, attribute performance A, and attribute performance B. An in-game attribute and additional performance content are stored in the attribute performance database 1018 for each individual kigurumi 32.

The attribute performance A is an item in which performance information used to produce an additional performance on the user terminal 20 in accordance with the attribute of each individual kigurumi 32 is stored. For example, an object of the user terminal performance class is stored in the attribute performance A.

The attribute performance B is an item in which performance information used to produce an additional performance on the kigurumi terminal 30 in accordance with the attribute of each individual kigurumi 32 is stored. For example, an object of the kigurumi terminal performance class is stored in the attribute performance B.

FIG. 10D is a diagram illustrating a data structure of the attribute additional performance database 1019. The attribute additional performance database 1019 is a database that includes columns for kigurumi attribute, user attribute, attribute additional performance A, and attribute additional performance B. Additional performance content corresponding to a combination of the kigurumi attribute and the user attribute is stored in the attribute additional performance database 1019.

The attribute additional performance A is an item in which performance information used to produce an additional performance on the user terminal 20 in accordance with a combination of the attribute of the kigurumi 32 and the attribute of a game character held in the deck of the user is stored. For example, an object of the user terminal performance class is stored in the attribute additional performance A.

The attribute additional performance B is an item in which performance information used to produce an additional performance on the kigurumi terminal 30 in accordance with the combination of the attribute of the kigurumi 32 and the attribute of the game character held in the deck of the user is stored. For example, an object of the kigurumi terminal performance class is stored in the attribute additional performance B.

FIG. 11A is a diagram illustrating a data structure of the game control database 1021. The game control database 1021 is a database that uses the type code as a key and includes columns for character code, attribute information, control content A, and control content B.

The control content A is an item in which control information for acquiring a new in-game character on the user terminal 20 and controlling the performance of the in-game character is stored. The control content B is an item in which control information for adding (unlocking) a new quest by which an in-game character can advance the game on the user terminal 20 and increasing or reducing the reward for completing the quest is stored. A quest is an in-game event for which a completion condition is set.

FIG. 11B is a diagram illustrating a data structure of the repeat additional control database 1022. The repeat additional control database 1022 is a database that uses the number of acquisitions as a key and includes columns for character additional control and event additional control. Additional control content displayed on the user terminal 20 in accordance with the number of acquisitions is stored in the repeat additional control database 1022 for each individual kigurumi 32.

The character additional control is an item in which control information used to perform additional control on an in-game character on the user terminal 20 in accordance with the number of acquisitions for each individual kigurumi 32 is stored.

The quest additional control is an item in which control information used to perform additional control in relation to a quest on the user terminal 20 in accordance with the number of acquisitions for each individual kigurumi 32 is stored.

FIG. 11C is a diagram illustrating a data structure of the attribute additional control database 1023. The attribute additional control database 1023 is a database that includes columns for kigurumi attribute, user attribute, character additional control, and quest additional control. Additional control content applied to a character and a quest in accordance with a combination of the kigurumi attribute and the user attribute is stored in the attribute additional control database 1023.

The character additional control is an item in which control information used to perform additional control on an in-game character on the user terminal 20 in accordance with a combination of the attribute of the kigurumi 32 and the attribute of a game character held in the deck of the user is stored.

The quest additional control is an item in which control information used to perform additional control in relation to a quest on the user terminal 20 in accordance with a combination of the attribute of the kigurumi 32 and the attribute of a game character held in the deck of the user is stored.

<Configuration of Control Unit of Server 10>

A control unit 103 of the server 10 includes function units constituted by a transmission/reception unit 1031, a performance output unit 1032, a game control unit 1033, and a friend notification unit 1034. Note that the control units may be provided so as to be distributed among a plurality of servers. Alternatively, some of the control units may be provided so as to be distributed between the user terminal 20 and the kigurumi terminal 30, and as long as the functions of the control units can be realized as a system, any configuration may be employed.

The transmission/reception unit 1031 transmits and receives various data.

The performance output unit 1032 acquires the user ID and the identification information from the user terminal 20 through the transmission/reception unit 1031, checks the storage unit 101, and transmits performance content to the user terminal 20 and the kigurumi terminal 30.

The game control unit 1033 acquires the user ID and the identification information from the user terminal 20 through the transmission/reception unit 1031, checks the storage unit 101, and transmits the control content A and the control content B to the user terminal 20.

The friend notification unit 1034 checks the storage unit 101 on the basis of the user ID acquired from the user terminal 20, and notifies the user ID of a friend user associated with the user ID or users IDs located on the periphery of the user ID that the user is interacting with a kigurumi.

<Overview of User Terminal 20>

The user terminal 20 is an information processing device operated by a participating user who receives a performance service at an event in which a kigurumi participates.

The user terminal 20 is a smartphone, a mobile telephone, a PHS, a computer, a PDA, a wristwatch, a smartwatch, a head-mounted display, a computer such as an image generation device, or an information terminal.

The user terminal 20 is realized by the user by installing a game program (the game hereinafter) in the storage unit of a terminal owned by the user. Note that the user terminal 20 may also be realized by having an event organizer provide the user with a dedicated terminal with the game installed in the storage unit.

The user interacts with the kigurumi through the user terminal 20. By transmitting performance content received from the server 10 through an output device provided in the user terminal 20, the user can receive the performance service according to the present disclosure.

<Hardware Configuration of User Terminal 20>

FIG. 3 shows a hardware configuration of the user terminal 20. The user terminal 20 includes a storage unit 201, a control unit 202, a touch screen 203, a voice processing unit 204, a microphone 2041, a speaker 2042, a location information sensor 205, a camera 206, and a motion sensor 207.

The touch screen 203 is a multi-touch compatible touch screen. A multi-touch compatible touch screen is a display

2032 provided with a touch-sensitive device 2031 that can detect the locations of a plurality of points of contact by a finger, a pen tip, or the like.

Various contact detection methods exist, but in this embodiment, a case in which the touch-sensitive device 2031 uses an electrostatic capacitance method will be described an example.

<Functional Configuration of User Terminal 20>

The control unit 202 of the user terminal 20 is capable of receiving signals from the touch-sensitive device 2031, the microphone 2041, the location information sensor 205, the camera 206, and the motion sensor 207 as input signals, referring to the data stored in the storage unit 201, and performing various types of information processing based on a program.

The control unit 202 of the user terminal 20 is capable of outputting processing results acquired by the control unit 202 to the user through the display 2032 and the speaker 2042.

<Configuration of Storage Unit of User Terminal 20>

The storage unit 201 of the user terminal 20 stores a game program 2011, game information 2012, and a user ID 2013. Note that some or all of the data may be provided in the server 10, and as long as the functions of the storage unit 201 of the user terminal 20 can be realized as a system, any configuration may be employed.

The game program 2011 is a program for realizing the game. The game information 2012 and the user ID 2013 are data referred to when the game program 2011 is executed.

The user ID 2013 is information for identifying the user operating the user terminal 20. Note that the user ID includes information such as a session ID for identifying the user who is using the user terminal 20.

<Configuration of Control Unit of User Terminal 20>

The control unit 202 of the user terminal 20 includes function units constituted by a transmission/reception unit 2021, a game control unit 2022, and a data management unit 2023.

Note that some or all of the control units may be provided in the server 10, and as long as the functions of the control unit 202 of the user terminal 20 can be realized as a system, any configuration may be employed.

The transmission/reception unit 2021 transmits and receives various data. The control unit 202 controls various game-related processing by executing the game program 2011 stored in the storage unit 201. By executing the game program 2011, the control unit 202 functions as the transmission/reception unit 2021, the game control unit 2022, and the data management unit 2023.

The game control unit 2022 performs various types of determination processing related to advancement of the game. The game control unit 2022 performs calculation processing required to provide the game. The game control unit 2022 executes calculation processing described in the game program 2011 in accordance with operations of the touch screen 203 by the user, input signals from the microphone 2041, the location information sensor 205, the camera 206, and the motion sensor 207, and data relating to the performance content, received from the server 10.

The game control unit 2022 instructs the data management unit 2023 to add, update, or delete records of the game information 2012. The game control unit 2022 instructs the transmission/reception unit 2021 to transmit various data or the program.

The data management unit 2023 manages the various data stored in the storage unit 201 in accordance with instructions from the game control unit 2022. For example, the data management unit 2023 adds, updates, or deletes records of the game information 2012 in response to an instruction from the game control unit 2022.

<Overview of Game>

In this embodiment, a game in which an operated character operated by the user is caused to fight an enemy character will be described as an example of the game realized by the game program 2011.

Note that the game is not limited to a specific genre and may be a game of any genre. For example, the game may be a sport-themed game such as tennis, table tennis, dodge ball, baseball, soccer, or hockey, a puzzle game, a quiz game, an RPG, an adventure game, a shooting game, a simulation game, a training game, an action game, or the like.

Furthermore, the game is not limited to a specific play style and may be a game of any play style. For example, the game may be a single-player game played by a single user or a multi-player game played by a plurality of users, and among multi-player games, the game may be a competitive game in which the plurality of players compete with each other, a cooperative play game in which the plurality of users cooperate with each other, and so on.

The game information 2012 is information shared by the users. The game information 2012 may include, for example, information prescribing various game spaces. A "game space" is a space in which objects of the game characters that can be operated by the user are arranged. The game information 2012 may include various setting information relating to objects shared by the users, such as the arrangement positions, sizes, colors, and shapes of background objects such as trees, rocks, and buildings and objects of non player characters (NPCs) arranged within the game space.

The game information 2012 may include set values of performance parameters of the non player characters. The game information 2012 may include information relating to quests. The game information 2012 may include information relating to the winning probabilities of lotteries performed in the game space. A quest is an in-game event for which a completion condition is set. A completion condition may be set for each quest. Note that a failure condition may be set for the quest in addition to the completion condition. Furthermore, hereinafter, the objects of the characters arranged in the game space may be referred to simply as "characters".

The game information 2012 may include, for example, information relating to operable characters (referred to hereinafter as game characters), information relating to held assets, information indicating the degree of progress in the game, and so on. Here, examples of held assets include in-game currency, items, character accessories, and so on.

In this embodiment, a "multi-player function" is a function for advancing the game in a state where game advancement by a plurality of users is synchronized. When a plurality of users are logged into the game, the server 10 and the user terminal 20 perform various types of processing for handling the multi-player function.

<Preparation Space>

A preparation space is a game space in which no enemy characters appear. The preparation space is a game space in which the user is allowed to prepare for a quest. When the user performs an input operation indicating an instruction to start a quest while the control unit 202 is advancing the game in the preparation space, the control unit 202 transitions the game space from the preparation space to a fight space.

The fight space is a game space in which the game character and an enemy character meet and fight. The fight between the game character and the enemy character will be described in detail below.

<Fight Space>

The fight conducted in the fight space will now be described in detail. In a "fight" conducted during the game according to this embodiment, the game characters of the user and another user and an enemy character perform attack actions on each other.

Values of performance parameters (for example, attack power, defense power, speed, and so on) including at least a physical strength value are set for the game characters and the enemy character. The set values of the parameters of the game characters are included in the deck database 1013, and the set values of the parameters of the enemy character are included in the game information 2012.

In the fight space, the game control unit 2022 causes a game character held by the user of the user terminal 20 used by the user to perform an attack action in response to an input operation received by the touch screen 203. The game control unit 2022 then determines whether or not the attack by the game character has struck any of the enemy characters, or in other words whether or not the attack has been successful. Further, having determined that the attack by the game character has been successful, the game control unit 2022 calculates a damage value to be applied to the enemy character subjected to the attack. Furthermore, the game control unit 2022 subtracts the calculated damage value from the physical strength value of the enemy character. Alternatively, the game control unit 2022 compares the sum of the damage inflicted on the enemy character, including the calculated damage value, with the physical strength value of the enemy character.

When the physical strength value of the enemy character falls to or below 0, or when the sum of the damage inflicted on the enemy character equals or exceeds the physical strength value of the enemy character, the game control unit 2022 determines that the enemy character has been defeated.

In the fight space, the game control unit 2022 causes the enemy character to perform attack actions. Likewise with regard to the attack actions performed by the enemy character, the game control unit 2022 determines whether or not an attack has been successful in a similar manner to an attack action performed by the game character, and when an attack on the game character is successful, the game control unit 2022 calculates a damage value.

When the physical strength value of the game character falls to or below 0 or when the sum of the damage inflicted on the game character equals or exceeds the physical strength value of the game character, the game control unit 2022 determines that the game character has become unable to fight. In this case, even when the touch screen 203 receives an input operation relating to the game character, the game control unit 2022 does not cause the game character to perform an action corresponding to the input operation.

When the enemy character has been defeated during play in the fight space or the like, the game control unit 2022 gives a reward to the user. The reward includes at least one of an equipment item that the game character is equipped with, a material item for acquiring the equipment item, a strengthening item for strengthening the equipment item, and an attribute item that gives the game character an attribute.

<Overview of Kigurumi Terminal 30>

The kigurumi terminal 30 is an information processing device that is operated by the performer 33 wearing the kigurumi 32 at the event in which the kigurumi participates.

The kigurumi terminal 30 is a smartphone, a mobile telephone, a PHS, a computer, a PDA, a wristwatch, a smartwatch, a head-mounted display, a computer such as an image generation device, or an information terminal.

The kigurumi terminal 30 is realized when the event organizer provides the performer with a dedicated terminal with a predetermined program installed in the storage unit, and the performer wears the dedicated terminal. Note that the kigurumi terminal 30 may also be fixed to the kigurumi.

By transmitting performance content received from the server 10 through an output device connected to the kigurumi terminal 30, the kigurumi 32 provides the user with the performance service according to the present disclosure.

<Hardware Configuration of Kigurumi Terminal 30>

FIG. 4 shows a hardware configuration of the kigurumi terminal 30. The kigurumi terminal 30 is connected to a microphone 3031, a camera 3032, a location information sensor 3033, and a motion sensor 3034 as an input device 303. The kigurumi terminal 30 is connected to a light emission unit 3041, a display 3042, a speaker 3043, and an actuator 3044 as an output device 304.

The kigurumi terminal 30 is connected to the input device 303 and the output device 304 by a wired or wireless connection. The input device 303 and the output device 304 may also be fixed to the kigurumi 32. At this time, the kigurumi terminal 30 may be disposed on the outside of the kigurumi 32 rather than being fixed to the kigurumi 32, and may be configured to communicate with and control the input device 303 and the output device 304 fixed to the kigurumi 32 through wired or wireless communication.

The light emission unit 3041 is constituted by an LED. By controlling the light emission unit 3041 or the display 3042, the kigurumi terminal 30 can cause all or a part of the kigurumi to emit light or flash or change the intensity of the colors or the light, thereby changing the appearance of the kigurumi.

By controlling the speaker 3043, the kigurumi terminal 30 can output the call of the animal or the like being simulated by the kigurumi. More specifically, the call of the animal or living organism being simulated by the kigurumi or lines spoken by the character can be output. The voice of the kigurumi may be stored in the storage unit 301 in advance, and the control unit 302 may synthesize the voice of the kigurumi so as to cause the kigurumi to utter a name or the like.

By controlling the actuator 3044, the kigurumi terminal 30 can move parts (a part) of the kigurumi such as the ears or the tail of the kigurumi. More specifically, by controlling the actuator 3044, the kigurumi terminal 30 can selectively control an action of a part formed as part of the kigurumi 32, such as the ears, mouth, eyes, eyebrows, cheeks, whiskers, or tail of the kigurumi. In other words, the kigurumi terminal 30 can change the moving part and change the way the part moves.

<Functional Configuration of Kigurumi Terminal 30>

The control unit 302 of the kigurumi terminal 30 is capable of receiving signals from the input device 303 as input signals, referring to the data stored in the storage unit 301, and performing various types of processing based on a program. The control unit 302 of the kigurumi terminal 30 can output the processing results acquired by the control unit 302 to the outside through the output device 304.

The kigurumi terminal 30 controls the light emission unit 3041, the display 3042, the speaker 3043, and the actuator 3044 in accordance with performance information received by the server 10 so as to cause the kigurumi 30 to produce a performance that is highly interesting the users participating in the interactive event.

The performance information is information indicating the performance to be produced in relation to the kigurumi 30, and is constituted by control information for producing performances such as causing a specific light emission unit of the kigurumi 30 to flash, or causing the kigurumi 30 to make a sound or wag its tail or the like, for example.

<Configuration of Storage Unit of Kigurumi Terminal 30>

The storage unit 301 of the kigurumi terminal 30 stores a kigurumi program 3011 and a kigurumi ID 3012.

Note that some or all of the data may be provided in the server 10, and as long as the functions of the storage unit 301 of the kigurumi terminal 30 can be realized as a system, any configuration may be employed.

The kigurumi program 3011 is a program for realizing control of the kigurumi 32. The kigurumi ID 3012 is data referred to when the kigurumi program 32 is executed.

The kigurumi ID 3012 is information for identifying the kigurumi on which the kigurumi terminal 30 is provided. Note that the kigurumi ID includes information such as a session ID for identifying the kigurumi provided with the kigurumi terminal 30.

<Configuration of Control Unit of Kigurumi Terminal 30>

The control unit 302 of the kigurumi terminal 30 includes function units constituted by a transmission/reception unit 3021 and a kigurumi control unit 3022.

Note that some or all of the control units may be provided in the server 10, and as long as the functions of the control unit 302 of the kigurumi terminal 30 can be realized as a system, any configuration may be employed.

The transmission/reception unit 3021 transmits and receives various data. The control unit 302 performs various types of control relating to the kigurumi 32 by executing the kigurumi program 3011 stored in the storage unit 301. The control unit 302 functions as the transmission/reception unit 3021 and the kigurumi control unit 3022 by executing the kigurumi program 3011.

<Overview of Kigurumi 32>

FIGS. 5A and 5B are schematic diagram illustrating the kigurumi 32, FIG. 5A being a view of the kigurumi 32 substantially from the front, and FIG. 5B being a view of the kigurumi 32 substantially from the back.

<Configuration of Kigurumi 32>

The kigurumi 32 is outerwear that covers the body of the performer 33. A space into which the performer 33 climbs is formed in the interior of the kigurumi 32. When the performer 33 makes various movements in this state, the kigurumi 32 makes the same movements.

In the example shown in FIGS. 5A and 5B, the kigurumi 32 covers the whole body of the performer 33, but the kigurumi 32 need only be configured to cover at least a part of the performer 33. The kigurumi 32 represents a character such as an animal or a monster in appearance, and is manufactured from a boa fabric or a nylon fabric, for example.

The kigurumi 32 may be configured such that outside air is blown into the interior space by an air blower, thereby expanding the kigurumi so that the kigurumi maintains its shape. Note that the air blower may be disposed on an inner surface of the kigurumi 32 or carried on the back of the performer 33, for example.

An observation window 35 is formed in the kigurumi 32 so that the performer 33 inside the kigurumi 32 can observe the surroundings through the observation window 35. The observation window 35 is formed as, for example, an eye part or a mouth part of the character in order to prevent spectators from becoming aware of the presence of the performer 33 inside. Alternatively, for example, a configuration may be adopted in which a video of the surroundings photographed by a camera disposed in a part that is inconspicuous to the spectators, such as an eye or the mouth, is displayed on a spectacle-type terminal or the like worn by the performer 33.

The kigurumi 32 is provided with a performance output mechanism that outputs the performance of the kigurumi. For example, a mechanism for moving a part such as an ear, the mouth, or the tail of the kigurumi, a mechanism for causing the entire kigurumi or a part thereof to emit light, a mechanism for outputting a voice, or the like is provided. The performance output mechanism may be configured such that, for example, power is supplied from a battery 34 disposed in a dedicated pocket or the like of innerwear 36 worn by the performer 33.

The battery 34 is a secondary battery or the like and supplies power to a load portion such as the performance output mechanism included in the kigurumi terminal 30. For example, the battery 34 is disposed in a dedicated pocket located on the back part of the performer 33.

<Overview of Identification Device 40>

The identification devices 40A, 40B, 40C are devices having different identification information for each type of kigurumi or each individual kigurumi. On the basis of the identification information provided in the identification devices 40A, 40B, 40C, the kigurumis 32A, 32B, 32C equipped with the respective identification devices can be identified. In this embodiment, different identification information is provided in each of 40A, 40B, and 40C, but identical identification information may be provided in kigurumis of the same type.

<Configuration of Identification Device 40>

FIG. 6A is a diagram illustrating a configuration of a stamp 41 serving as an example of the identification device 40 according to the present disclosure. The stamp 41 includes an electrode 42, a handle 43, and a stamping surface 44. The stamping surface 44 of the stamp 41 is provided on a surface on the opposite side to the side on which the handle 43 is provided. The stamping surface 44 and a cross-section parallel to the stamping surface 44 of the body of the stamp 41 are formed in the shape of a quadrilateral stamp.

The stamp 41 includes five electrodes 42 serving as touch portions that allow the multi-touch compatible touch screen 203 of the user terminal 20 to detect arrangement information about the stamp 41 when brought simultaneously into contact therewith. The five electrodes 42 are provided fixedly on the stamping surface 44 so as to maintain a predetermined positional relationship with each other, and when the five electrodes 42 simultaneously contact the user terminal 20, the contact positions and the positional relationship thereof are recognized. Three of the five electrodes 42 are arranged near the three vertexes of the rectangle forming the stamping surface 44. By arranging the electrodes 42 in this manner, the up-down, left-right orientation of the stamp 41 can be recognized regardless of the orientation in which the stamping surface 44 of the stamp 41 is brought into contact with the touch screen 203. The electrodes 42 are circular and formed from a conductive material, and are structured so as to project from the stamping surface 44. The electrodes 42 are formed from a conductive material. Furthermore, in an exemplary embodiment, the electrodes 42 and a body portion 40*a* are formed from an opaque material. By forming the electrodes 42 from a conductive, opaque material, an image displayed when the stamp 41 is pressed against the touch screen 203 can be drawn on the stamping surface 44, whereby the image drawn when the stamp 41 is brought into contact with the user terminal 20 can be made to appear as if it has been stamped onto the user terminal. In an exemplary embodiment, the parts other than the electrodes are filled with an insulating (non-conductive) material such as resin so that the stamping surface is substantially flat. Thus, wobbling can be prevented at the time of stamping due to the existence of vertexes where the electrodes are not disposed, and all of the electrodes can be reliably brought into contact with the touch screen simultaneously. In an exemplary embodiment, the color of the electrodes and the color of the material filled into the parts other than the electrodes are the same color (transparent, for example). Thus, the locations of the electrodes can be made more difficult to visually identify, whereby unauthorized copying of the stamp can be prevented.

The handle 43 is the location held when the stamp 41 is stamped. The handle 43 is formed from a conductive material. The stamping surface 44 is the location on which the electrodes 42 are arranged, and is formed from a conductive material. Note that the above structure of the stamp 41 employs materials and configurations that are suitable for use as a stamp 41 used with an electrostatic capacitance-type touch screen. When the user terminal 20 uses another type of touch screen, the stamp 41 may employ materials and configurations with characteristics suited to the type of the touch screen. When conductivity is not required, a plurality of non-conductive touch portions that can be brought simultaneously into contact with the touch screen 203 may be provided on the stamping surface 44 of the stamp 41.

<Operation of Identification Device 40>

The electrodes 42 are arranged on the stamping surface 44 of the stamp 41 such that a similar effect to that achieved by touching a plurality of points with a finger, a pen tip, or the like is applied to the touch screen 203. The arrangement information of the electrodes 42 is provided so as to differ for each type of kigurumi or each individual kigurumi. Hence, the type of kigurumi or the individual kigurumi that stamped the stamp can be identified from the arrangement information of the electrodes 42.

<Modified Example of User Terminal 20 and Identification Device 40>

The identification device 40 may be a near field communication (NFC) tag. In this case, different identification information may be stored on the NFC tag for each type of kigurumi or each individual kigurumi, and the user terminal 20 may be provided with a reader for reading the content stored on the NFC tag.

Alternatively, the identification device 40 may be realized as part of the kigurumi terminal 30. In this case, the identification device 40 may be configured to transmit the identification information to the user terminal 30 by means of short-range wireless communication such as Bluetooth (registered trademark) with the user terminal 30.

As long as the user interacting with the kigurumi 32 can be identified appropriately and identification information for identifying the kigurumi 32 can be transmitted to the user terminal 20 of the user, the identification device 40 may be configured as desired.

<Operations of Information Processing System 1 (First Embodiment)>

Processing performed by the information processing system 1 according to a first embodiment will be described below with reference to FIGS. 12 and 13A, 13B, 13C, 13D, 13E, and 13F. At an event in which a plurality of kigurumis are participating, a user who is participating in the event searches for and interacts with a favorite kigurumi. During the interaction, the performer 33 of the kigurumi 32 stamps the stamp 41 held in the right hand of the kigurumi onto the user terminal 20 held by the participating user. Through a series of interactive events with kigurumis, the participating user can enjoy performance services on the user terminal 20 and from the kigurumi 32.

Figure 12:
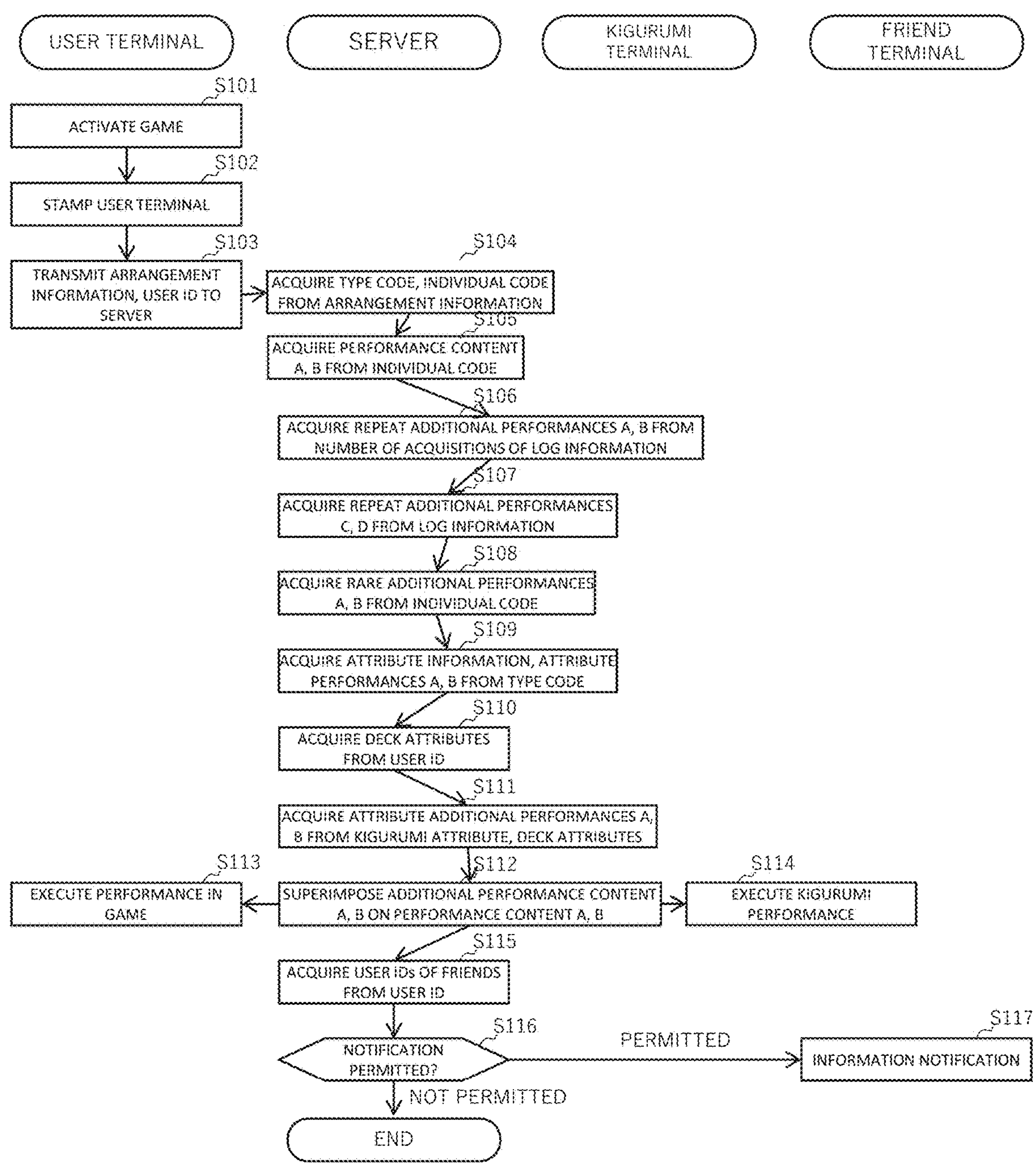
FIG. 12 is a flowchart illustrating operations of performance output processing performed by the server.

FIG. 12 is a flowchart illustrating operations of performance output processing performed by the server 10. FIGS. 13A, 13B, 13C, 13D, 13E, and 13F are diagrams illustrating examples of display screens of performance content displayed on the user terminal 20.

<Performance Output Processing>

In step S101, the user selects a predetermined icon from a display screen on the touch screen 203 of the user terminal 20 so as to activate the game program 2011. The user then selects a stamping button from the display screen of the activated game so as to display the stamping screen shown in FIG. 6B.

In step S102, the performer 33 of the kigurumi 32 brings the stamping surface 44 of the stamp 41 held in the right hand into contact with the touch screen 203 of the user terminal 20. The control unit 202 reads the arrangement information of the electrodes 42 provided on the stamping surface 44 of the stamp 41 brought into contact with the touch screen 203.

In this embodiment, the arrangement information is assumed to be "0010 0100".

In step S103, the transmission/reception unit 2021 of the user terminal 20 transmits the arrangement information and the user ID 2013 of the storage unit 201 to the communication unit 109 of the server 10 through the communication unit 209.

In step S104, the transmission/reception unit 1031 of the server 10 receives the arrangement information and the user ID from the user terminal 20 through the communication unit 109. The performance output unit 1032 of the server 10 searches the identification information database 1011 using the arrangement information "0010 0100" as a key, and acquires "BEAR-001", "TRUE", "CDBEAR", and "C" respectively as values of the individual code, the notification permission, the type code, and the rarity.

In step S105, the performance output unit 1032 of the server 10 searches the individual performance database 1015 using the individual code "BEAR-001" as a key, and acquires "display image: BEAR-001" as the value of the performance content A, which is performance content relating to the user terminal 20, and "LED color: pink, Flashing pattern: A, Effect sound: A, Kigurumi action: A" as the performance content B, which is performance content relating to the kigurumi terminal 30.

Figures 13A, 13B, 13C, 13D, 13E, 13F:
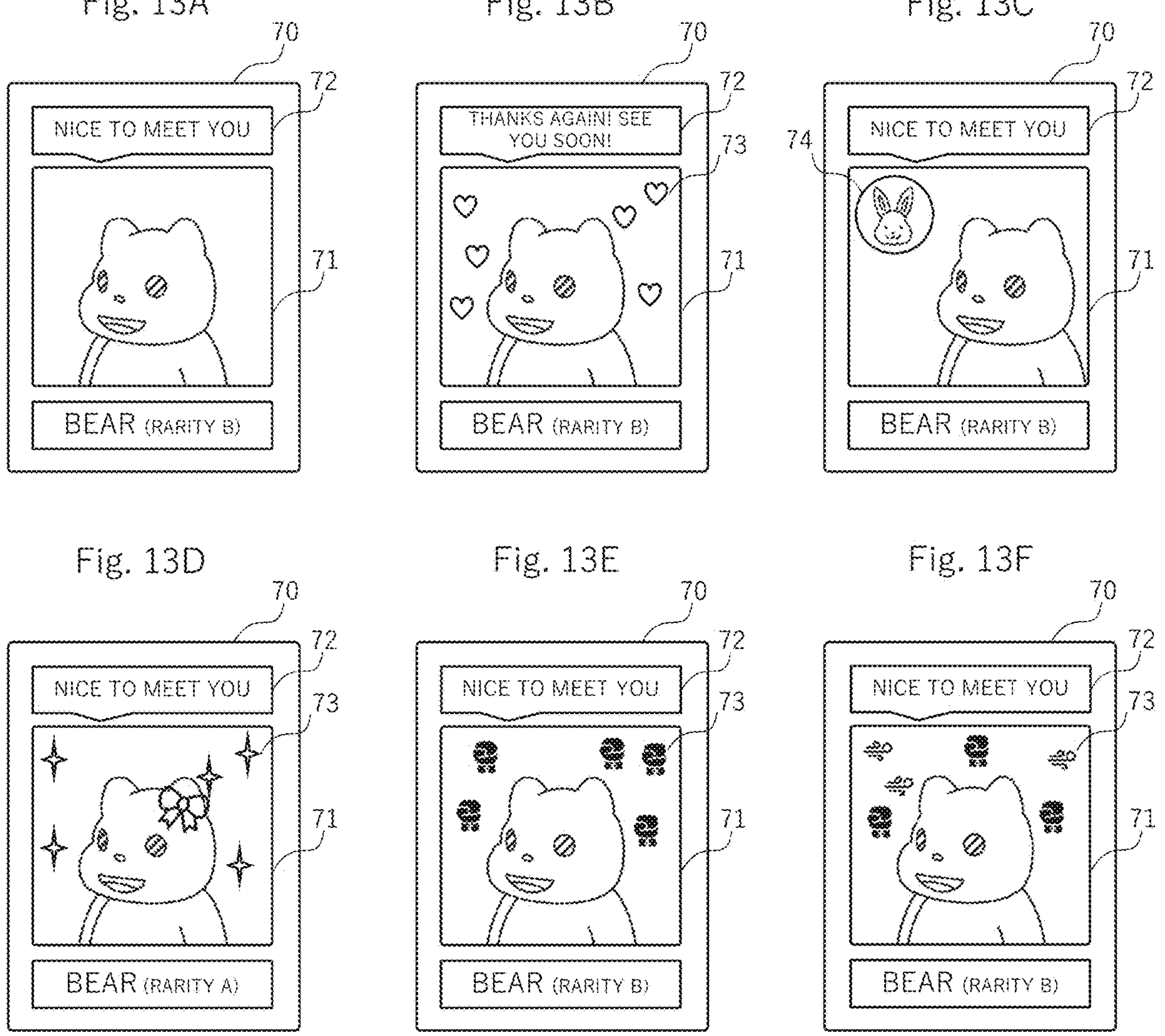
FIGS. 13A, 13B, 13C, 13D, 13E, and 13F are diagrams illustrating examples of display screens of performance content on the user terminal.

FIG. 13A is a diagram illustrating an example of a display screen of the performance content A displayed on the user terminal 20.

The performance content A is information including a performance instruction for causing the game control unit 2022 of the user terminal 20 to display an image specified by "BEAR-001" on an image display area 71 of a display screen 70 of the user terminal 20.

The performance content B is information including a performance instruction for causing the kigurumi control unit 3022 of the kigurumi terminal 30 to perform control so that the light emission unit 3041 of the kigurumi terminal emits pink light in a flashing pattern "A", an effect sound "A" is produced from the speaker 3043, and an action "A" is performed by the actuator 3044.

In step S106, the performance output unit 1032 of the server 10 searches the log information database 1014 using the user ID and the individual code as a key, and acquires the log information (the identification time and date, the identification order, and the number of acquisitions).

The performance output unit 1032 of the server 10 searches the repeat additional performance database 1016 using the number of acquisitions of the log information (the number of acquisitions of the identification information) as a key, and acquires the repeat additional performance A, which is additional performance content relating to the user terminal 20, and the repeat additional performance B, which is additional performance content relating to the kigurumi terminal 30.

Note that the number of acquisitions over an entire period or the number of acquisitions within a most recent predetermined period may be employed as the number of acquisitions of the log information. By limiting the number of acquisitions to the number of acquisitions within the most recent predetermined period, the user can be motivated to interact with a plurality of kigurumis within the predetermined period, and the event can be run smoothly.

Further, when no corresponding records exist in the repeat additional performance database 1016, null values are set as the repeat additional performance A and the repeat additional performance B.

FIG. 13B is a diagram illustrating an example of a display screen of the repeat additional performance A displayed on the user terminal 20. A case in which there are no additional performances (null values are set) other than the performance content A and the repeat additional performance A is envisaged.

The repeat additional performance A is information including a performance instruction for causing the game control unit 2022 of the user terminal 20 to draw a message saying, "Thanks again!" in a message area 72 of the user terminal 20 and to draw a background of "Effect A" in a background area 73 in addition to the performance content A.

In step S107, the performance output unit 1032 of the server 10 generates and acquires a repeat additional performance C, which is additional performance content relating to the user terminal 20, and a repeat additional performance D, which is additional performance content relating to the kigurumi terminal 30, on the basis of the identification order of the individual codes in the log information. In this case, the employed individual codes may be limited to only a predetermined number of the most recent individual codes.

Note that instead of the information in the identification order column of the log information database 1014, the information in the identification time and date column may be used as the identification order of the individual codes. In this case, the employed individual codes may be limited to only the individual codes having identification times and dates within a predetermined most recent period.

Alternatively, the repeat additional performance C and the repeat additional performance D may be generated with respect to combinations of individual codes, irrespective of the identification order.

Note that when there is only one set of log information, null values are set as the repeat additional performance C and the repeat additional performance D.

FIG. 13C is a diagram illustrating an example of a display screen of the repeat additional performance C displayed on the user terminal 20. A case in which there are no additional performances (null values are set) other than the performance content A and the repeat additional performance C is envisaged.

In this example, it is assumed that the user acquired the identification information of "RABBIT-003" previously, and an acquisition record is stored in the log information database. At this time, a display image "RABBIT-003" relating to the previously acquired identification information "RABBIT-003" is displayed in superimposed fashion in a display frame 74 in the upper left of the image display area 71 of the user terminal 20.

In step S108, the performance output unit 1032 of the server 10 searches the rare additional performance database 1017 using the individual code as a key, and acquires the rarity, the rare additional performance A, which is additional performance content relating to the user terminal 20, and the rare additional performance B, which is additional performance content relating to the kigurumi terminal 30.

The performance output unit 1032 of the server 10 sets new rarity values by overriding the rarity value determined for each type, acquired in step S104, with the rarity value of each individual, stored in the rare additional performance database 1017.

When no corresponding records exist in the rare additional performance database 1017, null values are set as the rare additional performance A and the rare additional performance B.

FIG. 13D is a diagram illustrating an example of a display screen of the rare additional performance A displayed on the user terminal 20. A case in which there are no additional performances (null values are set) other than the performance content A and the rare additional performance A is envisaged.

In this example, it is assumed for convenience that the subject individual code is "BEAR-002". In this case, the rare additional performance A is information including a performance instruction for causing the game control unit 2022 of the user terminal 20 to draw a background of "Effect B" in the background area 73 of the user terminal 20.

In step S109, the performance output unit 1032 of the server 10 searches the attribute performance database 1018 using the type code as a key, and acquires the attribute information, the attribute performance A, which is additional performance content relating to the user terminal 20, and the attribute performance B, which is additional performance content relating to the kigurumi terminal 30.

When no corresponding records exist in the attribute performance database 1018, null values are set as the attribute performance A and the attribute performance B.

FIG. 13E is a diagram illustrating an example of a display screen of the attribute performance A displayed on the user terminal 20. A case in which there are no additional performances (null values are set) other than the performance content A and the attribute performance A is envisaged.

The attribute performance A is information including a performance instruction for causing the game control unit 2022 of the user terminal 20 to draw a background of "Effect G" in the background area 73 of the user terminal 20.

In step S110, the performance output unit 1032 of the server 10 searches the deck database 1013 using the user ID as a key, and acquires the type code and the character attribute of each of the characters included in the deck of the user ID.

In step S111, the performance output unit 1032 of the server 10 searches the attribute additional performance database 1019 using the attribute information acquired in step S109 and the character attribute acquired in step S110 as keys relating respectively to the kigurumi attribute column and the user attribute column, and acquires the attribute additional performance A, which is additional performance content relating to the user terminal 20, and the attribute additional performance B, which is additional performance content relating to the kigurumi terminal 30.

FIG. 13F is a diagram illustrating an example of a display screen of the attribute additional performance A displayed on the user terminal 20. A case in which there are no additional performances (null values are set) other than the performance content A and the attribute additional performance A is envisaged.

The attribute additional performance A is information including a performance instruction for causing the game control unit 2022 of the user terminal 20 to draw a background of "Effect J" in the background area 73 of the user terminal 20.

Note that when, in step S110, the deck includes a plurality of characters, the attribute additional performance A and the attribute additional performance B may be acquired either singly or in a plurality with respect to some or all of the character attributes.

Further, when no corresponding records exist in the deck database 1013 and the attribute additional performance database 1019, null values are set as the attribute additional performance A and the attribute additional performance B.

In step S112, the repeat additional performance A, the repeat additional performance C, the rare additional performance A, the attribute performance A, and the attribute additional performance A are superimposed on the performance content A.

More specifically, the performance content A transmitted to the user terminal 20 is an object (an instance) of the "user terminal performance class", having properties such as "display image", "message", "character effect", "background effect", and "animation". Through steps S106-S111, the performance content A is overridden similarly by the acquired repeat additional performance A, repeat additional performance C, rare additional performance A, attribute performance A, and attribute additional performance A, which are objects of the "user terminal performance class".

For example, when the object "Display image: BEAR-002" of the performance content A acquired in step S105 is overridden by the object "Message: Thanks again! See you soon!" of the repeat additional performance A, the performance content A becomes an object having two properties, namely "Display image: BEAR-002, Message: Thanks again! See you soon!".

Similarly, the repeat additional performance B, the repeat additional performance D, the rare additional performance B, the attribute performance B, and the attribute additional performance B are superimposed on the performance content B.

More specifically, the performance content B transmitted to the user terminal 20 is an object (an instance) of the "kigurumi terminal performance class", having properties such as "LED color", "flashing pattern", "effect sound", "voice", and "kigurumi action". Through steps S106 to S111, the performance content B is overridden similarly by the acquired repeat additional performance B, repeat additional performance D, rare additional performance B, attribute performance B, and attribute additional performance B, which are objects of the "user terminal performance class".

For example, when the object "LED color: pink, Flashing pattern: A, Effect sound: A, Kigurumi action: A" of the performance content B acquired in step S105 is overridden by the object "Flashing pattern: B, Effect sound: B, Voice: B" of the repeat additional performance B, the performance content A becomes an object constituted by "LED color: pink, Flashing pattern: B, Effect sound: B, Voice: B, Kigurumi action: A".

Note that superimposing of the performance content is not limited to the embodiment described above. A plurality of performance content items may be overwritten at time intervals rather than being overwritten all at once. For example, with regard to the performance content A, the performance content A may be set for an initial predetermined number of seconds, after which the performance content A may be overridden by the repeat additional performance A for the next few seconds, overridden by the repeat additional performance C for the next few seconds, overridden by the rare additional performance A for the next few seconds, overridden by the attribute performance A for the next few seconds, and overridden by the attribute additional performance A for the next few seconds. By superimposing the performance content in this manner, a plurality of additional performance content items can be provided to the user at time intervals, thereby making it possible to further enhance interest through the performance service.

Next, the transmission/reception unit 1031 of the server 10 transmits the superimposed performance content A and performance content B respectively to the transmission/reception units of the user terminal 20 and the kigurumi terminal 30.

In step S113, the transmission/reception unit 2021 of the user terminal 20 receives the performance content A transmitted from the server 10. The game control unit 2022 of the user terminal 20 controls the display 2032 and the speaker 2042 on the basis of the performance content A so as to produce a performance on the user terminal 20.

In step S114, the transmission/reception unit 3021 of the kigurumi terminal 30 receives the performance content B transmitted from the server 10. The kigurumi control unit 3022 of the kigurumi terminal 30 controls the light emission unit 3041, the display 3042, the speaker 3043, and the actuator 3044 of the output device 304 on the basis of the performance content B so as to cause the kigurumi 32 to produce a performance.

In step S115, the friend notification unit 1034 of the server 10 searches the user information database 1012 using the user ID "USER1" as a key, and acquires location information "Q" and friend user IDs "USER2", "USER4", and "USER5" associated with the user ID.

In step S116, when the notification permission acquired in step S104 indicates "permitted", the friend notification unit 1034 of the server 10 transmits the user ID "USER1" and notification information to the user IDs "USER2", "USER4", and "USER5".

When, on the other hand, the notification permission indicates "not permitted", the user ID "USER1" and the notification information are not transmitted.

In step S117, the game control units 2022 of the user terminals 20 of the user IDs "USER2", "USER4", and "USER5" respectively notify "USER2", "USER4", and "USER5" that "USER1" is with a kigurumi at an event on the displays 2032 on the basis of the received user ID and notification information.

Figures 14A, 14B:
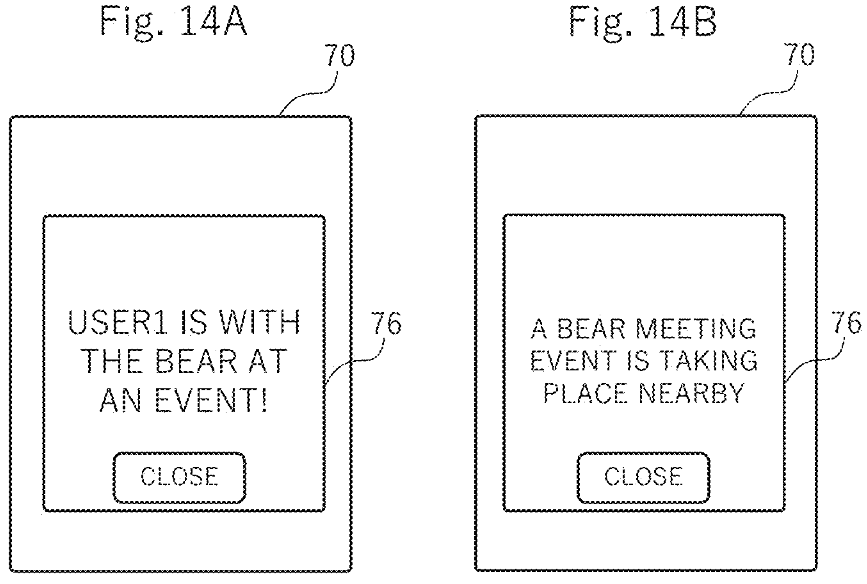
FIGS. 14A and 14B are diagrams illustrating examples of display screens on the user terminal of a friend.

FIG. 14A is a diagram illustrating an example of a display screen displayed on the user terminal 20 of a friend. For example, the game control unit 2022 of the user terminal 20 of the user ID "USER2" displays "USER1 is with the bear at an event!" in a notification display area 76 of the display screen 70 of the user terminal 20 on the basis of the notification information received by the server 10.

Note that in step S115, instead of referring to the friends IDs, users within a predetermined distance range of the location information "Q" of the user ID "USER1" may be searched for from the location information in the user information database 1012, and the found users may be set as user IDs of friends.

FIG. 14B is a diagram illustrating an example of a display screen displayed on the user terminal 20 of a friend. For example, the game control unit 2022 of the user terminal 20 of a user located within a predetermined range of "USER1" displays "A bear meeting event is taking place nearby!" in the notification display area 76 of the display screen 70 of the user terminal 20 on the basis of the notification information received by the server 10.

<Operations of Information Processing System 1 (Second Embodiment)>

Processing performed by the information processing system 1 according to a second embodiment will be described below with reference to FIGS. 15 and 16A, 16B, 16C, 16D, and 16E. At an event in which a plurality of kigurumis are participating, a user who is participating in the event searches for and interacts with a favorite kigurumi. During the interaction, the performer 33 of the kigurumi 32 stamps the stamp 41 that is fixed to the kigurumi on the user terminal 20 held by the participating user. By changing the actions of a game played on the user terminal 20 through a series of interactive events with kigurumis, the participating user can be more strongly motivated to participate in the interactive events.

Figure 15:
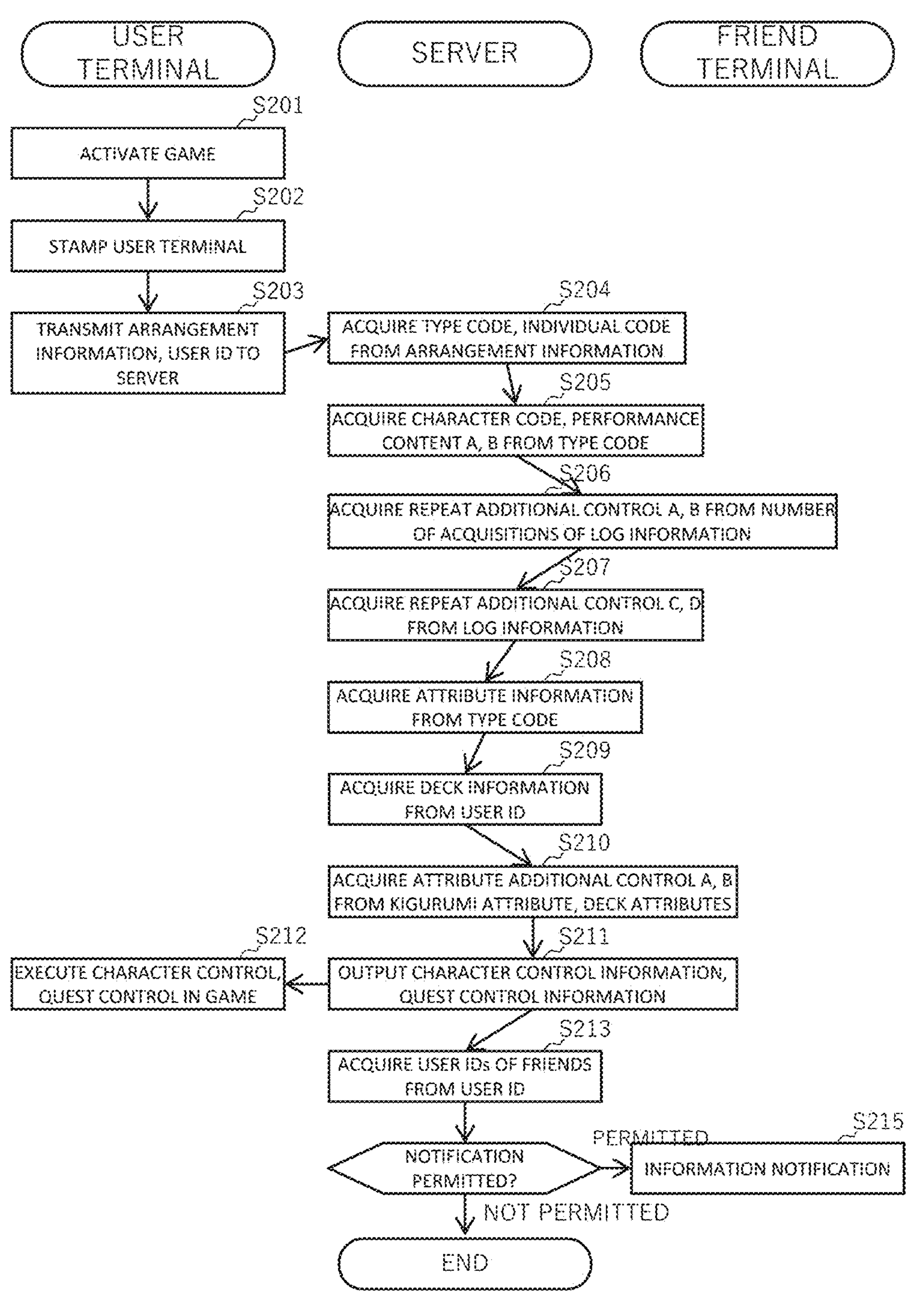
FIG. 15 is a flowchart illustrating operations of game control processing performed by the server.

FIG. 15 is a flowchart illustrating operations of the game control processing performed by the server 10. FIGS. 16A, 16B, 16C, 16D, and 16E are diagrams illustrating examples of display screens of the game control processing, displayed on the user terminal 20.

Processing of steps S201 to S204 is similar to steps S101 to S104 of the first embodiment, and therefore description thereof has been omitted. Processing of steps S213 to S215 is similar to steps S115 to S117 of the first embodiment, and therefore description thereof has been omitted.

<Game Control Processing>

In step S205, the game control unit 1033 of the server 10 searches the game control database 1021 using the type code "CDBEAR" as a key, and acquires the value "Bear" of the character code, acquires "Acquired character: Bear, Parameter control: Bear attack power+4 (6 hours)" as the value of the control content A, which is control information relating to an in-game character in the game played on the user terminal 20, and acquires "Quest unlocked: Bear's Cave (LV1), Reward increase: Defeat wolf (2×)" as the value of the control content B, which is control information relating to a quest.

FIG. 16A is a diagram illustrating an example of a display screen corresponding to the control content A.

On the basis of the control content A, the game control unit 2022 of the user terminal 20 displays the acquired game character "Bear" in an image display area 81 of a game display screen 80 of the user terminal 20, and displays parameter control content in a bonus display area 82.

FIG. 16B is a diagram illustrating an example of a display screen corresponding to the control content B.

On the basis of the control content B, the game control unit 2022 of the user terminal 20 displays a newly unlocked quest 85 in a quest display area of the game display screen 80 of the user terminal 20 so as to be selectable by the user, and displays reward bonus content 86 in relation to the quest that is subject to the reward increase.

In step S206, the game control unit 1033 of the server 10 searches the log information database 1014 using the user ID and the individual code as a key, and acquires the log information (the identification time and date, the identification order, and the number of acquisitions).

The game control unit 1033 of the server 10 searches the repeat additional control database 1022 using the number of acquisitions in the log information as a key, and acquires repeat additional control A, which is additional control information relating to the in-game character of the game played on the user terminal 20, and repeat additional control B, which is additional control information relating to the quest.

Note that the number of acquisitions over an entire period or the number of acquisitions within a most recent predetermined period may be employed as the number of acquisitions of the log information. By limiting the number of acquisitions to the number of acquisitions within the most recent predetermined period, the user can be motivated to interact with a plurality of kigurumis within the predetermined period, and the event can be run smoothly.

Further, when no corresponding records exist in the repeat additional control database 1022, null values are set as the repeat additional control A and the repeat additional control B.

FIG. 16C is a diagram illustrating an example of a display screen corresponding to the repeat additional control A. A case in which there is no additional control content (null values are set) other than the control content A and the repeat additional control A is envisaged.

On the basis of the repeat additional control A, the game control unit 2022 of the user terminal 20 displays parameter control content corrected in accordance with the repeat additional control A in the bonus display area 82 of the game display screen 80 of the user terminal 20.

In step S207, the game control unit 1033 of the server 10 generates and acquires repeat additional control C, which is additional control relating to the in-game character of the game played on the user terminal 20, and repeat additional control D, which is additional control information relating to the quest, on the basis of the identification order of the individual codes in the log information. In this case, the employed individual codes may be limited to only a predetermined number of the most recent individual codes. Note that instead of the information in the identification order column of the log information database 1014, the information in the identification time and date column may be used as the identification order of the individual codes. In this case, the employed individual codes may be limited to only the individual codes having identification times and dates within a predetermined most recent period.

Alternatively, the repeat additional control C and the repeat additional control D may be generated with respect to combinations of individual codes, irrespective of the identification order.

Note that when there is only one set of log information, null values are set as the repeat additional control C and the repeat additional control D.

In step S208, the game control unit 1033 of the server 10 searches the attribute performance database 1018 using the type code as a key, and acquires the attribute information.

In step S209, the game control unit 1033 of the server 10 searches the deck database 1013 using the user ID as a key, and acquires the type code and the character attribute of each of the characters included in the deck of the user ID.

In step S210, the game control unit 1033 of the server 10 searches the attribute additional control database 1023 using the attribute information acquired in step S108 and the character attribute acquired in step S109 as keys relating respectively to the kigurumi attribute column and the user attribute column, and acquires the attribute additional control A, which is additional control information relating to the in-game character in the game played on the user terminal 20, and the attribute additional control B, which is additional control information relating to the quest.

Note that when, in step S209, the deck includes a plurality of characters, the attribute additional control A and the attribute additional control B may be acquired either singly or in a plurality with respect to some or all of the character attributes.

Further, when no corresponding records exist in the deck database 1013 and the attribute additional control database 1023, null values are set as the attribute additional control A and the attribute additional control B.

FIG. 16D is a diagram illustrating an example of a display screen corresponding to the attribute additional control A, displayed on the user terminal 20. A case in which there is no additional control content (null values are set) other than the control content A and the attribute additional control A is envisaged.

On the basis of the attribute additional control A, the game control unit 2022 of the user terminal 20 displays parameter control content corrected in accordance with the attribute additional control A in the bonus display area 82 of the game display screen 80 of the user terminal 20. At this time, when a given attribute exists, the given attribute is displayed in the attribute display area 83.

In step S211, the repeat additional control A, the repeat additional control C, and the attribute additional control A are superimposed on the control content A.

More specifically, the control content A transmitted to the user terminal 20 is an object (an instance) of a "character control class", having properties such as "acquired character", "parameter control", and "additional attribute". Through steps S206 to S210, the control content A is corrected by the repeat additional control A, the repeat additional control C, and the attribute additional control A, which are acquired objects.

For example, when the object "Acquired character: Bear, Parameter control: Bear attack power+4 (6 hours)" of the control content A acquired in step S205 is corrected by the object "Parameter control: 2×" of the repeat additional control A, the performance content A becomes an object having two properties, namely "Acquired character: Bear, Parameter control: Bear attack power+8 (6 hours)".

Further, when the object "Acquired character: Bear, Parameter control: Bear attack power+4 (6 hours)" of the control content A acquired in step S205 is corrected by the object "Parameter control: 1.5×, Additional attribute: water" of the attribute additional control A, the performance content A becomes an object having three properties, namely "Acquired character: Bear, Parameter control: Bear attack power+6 (6 hours), Additional attribute: water".

Similarly, the repeat additional control B, the repeat additional control D, and the attribute additional control B are superimposed on the control content B.

More specifically, the control content B transmitted to the user terminal 20 is an object (an instance) of a "quest control class", having properties such as "Quest unlocked" and "Reward increase".

Through steps S206 to S210, the control content B is corrected by the repeat additional control B, the repeat additional control D, and the attribute additional control B, which are acquired objects.

For example, when the object "Quest unlocked: Bear's cave (LV1), Reward increase: Defeat wolf (2×)" of the control content B acquired in step S205 is corrected by the object "Quest unlocked: LV2, Reward increase: 4×" of the repeat additional control B, the performance content B becomes an object having two properties, namely "Quest unlocked: Bear's cave (LV2), Reward increase: Defeat wolf (4×)".

When the control content A includes information relating to the acquisition of an in-game character, the game control unit 1033 of the server 10 registers the corresponding in-game character in the deck of the user by adding records of the character code, type code, and character attribute in the deck database 1013 to the user ID corresponding to the user terminal 20.

Next, the transmission/reception unit 1031 of the server 10 transmits the superimposed control content A and control content B to the transmission/reception unit of the user terminal 20.

In step S212, the transmission/reception unit 2021 of the user terminal 20 receives the control content A and the control content B, transmitted from the server 10. The game control unit 2022 of the user terminal 20 controls the settings of the game information 2012 on the basis of the control content A and the control content B. The data management unit 2023 of the user terminal 20 updates the data in the game information 2012 on the basis of the control content A and the control content B.

For example, when the control content B includes information relating to the unlocking of a quest, the game control unit 2022 of the user terminal 20 updates the game information 2012 so as to set the subject quest to be selectable by the user. Further, when the control content B includes information relating to a reward increase for the quest, the data management unit 2023 of the user terminal 20 updates the game information 2012 so as to increase the reward for the subject quest.

FIG. 16E is a diagram illustrating an example of a display screen corresponding to the control content A. As shown in FIG. 16E, the game control unit 2022 and the data management unit 2033 may be controlled to give the user an in-game item used to acquire an in-game character and unlock a quest instead of acquiring the in-game character and unlocking the quest.

Note that the embodiment described above relates to character acquisition, quest unlocking, increasing the quest reward, and increasing the performance parameter of the character, but processing for losing a character, locking a quest, reducing the quest reward, and reducing the performance parameter of the character may also be performed in accordance with the kigurumi 32 or the compatibility with the attributes of the kigurumi 32 and the characters held in the deck of the user.

In step S211, when the reward for the quest of the user is to be changed, control may be performed so as to acquire the time and date at which the user completed the quest and validate the changed reward only if the completion time and date are within the period in which the event is held. Although the user can receive a bonus in the form of a change to the quest reward through interaction with the kigurumi 32 within the period in which the event is held, the user does not always complete the quest within the period in which the event is held. By limiting the validation period of the changed reward bonus for the quest to within the period in which the event is held, the user can be motivated to complete the quest within the period in which the event is held.

In step S211, when the reward for the quest of the user is to be changed, control may be performed so as to acquire the time and date at which the user completed the quest and validate the changed reward only if the completion time and date are within the period in which the event is held. Although the user can receive a bonus in the form of a change to the quest reward through interaction with the kigurumi 32 within the period in which the event is held, the user does not always complete the quest within the period in which the event is held. By limiting the validation period of the changed reward bonus for the quest to within the period in which the event is held, the user can be motivated to complete the quest within the period in which the event is held.

In step S211, when the reward for the quest of the user is to be changed, control may be performed so as to acquire the location information of the user at the time when the user completed the quest and validate the changed reward only if the location information is within the event venue.

Although the user can receive a bonus in the form of a change in the quest reward through interaction with the kigurumi 32 at the event venue, the user does not always complete the quest at the event venue. By limiting the validation area of the changed reward bonus for the quest to within the event venue, the user can be motivated to complete the quest at the event venue.

Note that in the game control processing according to the present disclosure, the game control processing is performed in one specific game, but a configuration in which interaction with the kigurumi 32 selectively affects all or some of a plurality of games may be employed.

In this case, for example, a plurality of different games are respectively provided with different game control databases 1021, repeat additional control databases 1022, and attribute additional control databases 1023. Meanwhile, the plurality of different games share the log information database 1014. Thus, interaction between the user and the kigurumi 32 can be used in the game control processing of a plurality of different games.

Note that in this case, the user may select whether or not the log information database 1014 is to be shared by the plurality of different games. Further, during the game control processing of a specific game, the user may select whether or not the results of interaction with the kigurumi 32 are to be used in the other games.

<Operations of Information Processing System 1 (Third Embodiment)>

Processing performed by the information processing system 1 according to a third embodiment will now be described. At an event in which a plurality of kigurumis are participating, a user who is participating in the event searches for and interacts with a favorite kigurumi. During the interaction, the performer 33 of the kigurumi 32 stamps the stamp 41 that is fixed to the kigurumi on the user terminal 20 held by the participating user.

In the third embodiment, the user can check which kigurumis the user has and has not interacted with on the display 2032 of the user terminal 20 by operating the user terminal 20.

The user selects a predetermined icon from the display screen of the touch screen 203 of the user terminal 20 in order to activate the game program 2011. A kigurumi encyclopedia button is selected from the display screen of the activated game.

The transmission/reception unit 2021 of the user terminal 20 transmits the user ID 2013 to the communication unit 109 of the server 10 through the communication unit 209.

The transmission/reception unit 1031 of the server 10 receives the user ID from the user terminal 20 through the communication unit 109.

The performance output unit 1032 of the server 10 searches the log information database 1014 using the user ID as a key, and acquires the type codes and individual codes of the kigurumis with which the user has interacted heretofore. The performance output unit 1032 of the server 10 refers to the identification information database 1011 to acquire the individual codes and type codes of all of the kigurumis.

The transmission/reception unit 1031 of the server 10 transmits the type codes and individual codes of the kigurumis with which the user has interacted heretofore and the individual codes and type codes of all of the kigurumis to the user terminal 20.

The transmission/reception unit 2021 of the user terminal 20 receives the type codes and individual codes of the kigurumis with which the user has interacted heretofore and the individual codes and type codes of all of the kigurumis, transmitted from the server 10.

The game control unit 2022 of the user terminal 20 displays the kigurumis with which the user has interacted heretofore by associating images relating to the appearance of the kigurumis with stamp marks indicating that the interaction took place. Thus, the user can check which kigurumis the user has interacted with in the past.

The game control unit 2022 of the user terminal 20 displays the kigurumis with which the user has not interacted with by not associating images relating to the appearance of the kigurumis with stamp marks. Thus, the user can check which kigurumis the user has not interacted with in the past.

By displaying lists of kigurumis with which interaction has taken place and kigurumis with which interaction has not taken place distinguishably on the user terminal 20 in this manner, the user can be encouraged to interact with a new kigurumi that the user has not yet interacted with.

<Basic Hardware Configuration of Computer>

Figure 17:
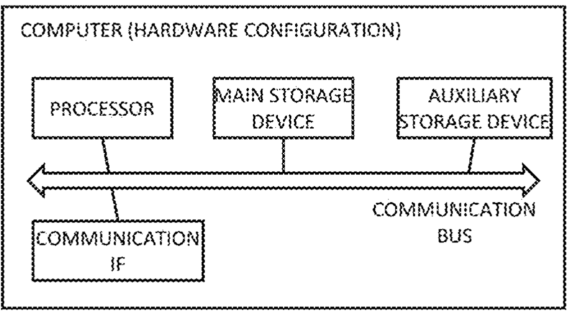
FIG. 17 is a block diagram illustrating a basic hardware configuration of a computer.

FIG. 17 is a block diagram illustrating a basic hardware configuration of a computer. The computer includes a processor, a main storage device, an auxiliary storage device, and a communication interface. These components are electrically connected to each other by a communication bus.

The processor is hardware for executing an instruction set described in a program. The processor is constituted by a calculation device, a register, a peripheral circuit, and so on.

The main storage device is used to temporarily store programs, data processed by the programs or the like, and so on. For example, the main storage device is a volatile memory such as a dynamic random access memory (DRAM).

The auxiliary storage device is a storage device for storing data and programs. For example, the auxiliary storage device is a flash memory, a hard disc drive (HDD), a magneto-optical disk, a CD-ROM, a DVD-ROM, a semiconductor memory, or the like.

The communication interface (Interface) is an interface for inputting and outputting signals for communicating with an external device using a wired or wireless communication standard.

<Basic Functional Configuration of Computer>

A functional configuration of the computer, which is realized by the basic hardware configuration of the computer (FIG. 17), will now be described. The computer includes a control unit, a communication unit, and a storage unit.

The processor reads the program from the auxiliary storage device, expands the program to the main storage device, and executes processing in accordance with the program. As a result, the control unit can be caused to function as various function units. Further, when the program is distributed to the computer through a network, the computer that receives the distributed program may expand the program to the main storage device and execute processing in accordance with the program.

The communication unit is realized by a communication interface. The communication unit realizes a function for communicating with another computer through a network. Information transmitted from the other computer can be received, and information can be transmitted to the other computer. The network is constituted by the Internet, a LAN, any of various mobile communication systems constructed using wireless base stations, and so on. Examples include 3G, 4G, and 5G mobile communication systems, long term evolution (LTE), a wireless network that can be connected to the Internet through a predetermined access point (for example, Wi-Fi (registered trademark)), and so on. In the case of a wireless connection, Z-Wave (registered trademark), ZigBee (registered trademark), Bluetooth (registered trademark), and so on, for example, may be used as the communication protocol. In the case of a wired connection, the communication unit may be connected by a universal serial bus (USB) cable or the like.

The storage unit is realized by the main storage device and the auxiliary storage device. The storage unit realizes a function for storing data, programs, and the various databases. The processor can secure a storage area corresponding to the storage unit in the main storage device or the auxiliary storage device in accordance with the program.

APPENDICES

Matters described in each of the above embodiments will be appended below.

Appendix 1

A program that is executed on a computer having a processor and a storage unit, wherein the program causes the processor to execute a first step (S102) for acquiring first identification information corresponding to a kigurumi, a second step (S103) for acquiring first user identification information corresponding to a first user terminal, and a third step (S105) for outputting performance information relating to the kigurumi on the basis of a combination of the first identification information and the first user identification information, and a different value can be set as the first identification information for each of a plurality of kigurumis.

Thus, the user can receive a different performance service from each type of kigurumi or each individual kigurumi, and as a result, the user can receive a more special performance experience.

Appendix 2

The program according to appendix 1, wherein the program causes the processor to execute a fourth step (S106) for acquiring a number of past acquisitions of the first identification information for each set of the first user identification information, and the third step is a step (S106) for outputting the performance information on the basis of the number of acquisitions.

Thus, when the user interacts again with an individual kigurumi 32 that the user has interacted with previously, a performance that is unique to the user is produced. As a result, the user can be motivated to participate repeatedly in events.

Appendix 3

The program according to appendix 2, wherein the fourth step is a step (S106) for acquiring the number of acquisitions of the first identification information within a predetermined period.

Thus, the user participating in the event can be encouraged to interact with a plurality of kigurumis 32 within a predetermined period. As a result, the user can be motivated to interact actively with the kigurumis 32.

Appendix 4

The program according to any of appendixes 1 to 3, wherein the program causes the processor to execute a fifth step (S102) for acquiring second identification information, which differs from the first identification information, from a second kigurumi, and the third step is a step (S107) for outputting the performance information on the basis of a combination of the first identification information and the second identification information.

Thus, the user can receive different unique performance services corresponding to combinations of a plurality of different kigurumis, and as a result, the user can receive an even more special performance experience.

Appendix 5

The program according to appendix 4, wherein the third step is a step (S107) for outputting the performance information on the basis of the first identification information and the second identification information when an identification time and date of the first identification information and an identification time and date of the second identification information are within a predetermined period (S107).

Thus, the user participating in the event can be encouraged to interact with a plurality of kigurumis 32 within the predetermined period, and as a result, the user can be motivated to interact actively with the kigurumis 32.

Appendix 6

The program according to appendix 4 or 5, wherein the third step is a step for outputting different performance information on the basis of the acquisition order (S107) of the first identification information and the second identification information.

Thus, the user can receive different unique performance services corresponding to the identification order of a plurality of different kigurumis, and as a result, the user can receive an even more special performance experience.

Appendix 7

The program according to any of appendices 1 to 6, wherein the program causes the processor to execute a sixth step (S108) for acquiring rarity information relating to the kigurumi on the basis of the first identification information, and the third step is a step (S108) for outputting the performance information on the basis of the rarity information.

Thus, the user can receive a unique performance service corresponding to the rarity of the kigurumi 32 the user is interacting with, and as a result, the user can receive an even more special performance experience.

Appendix 8

The program according to any of appendices 1 to 7, wherein the program causes the processor to execute a seventh step (S109) for acquiring first attribute information relating to the kigurumi on the basis of the first identification information, and an eighth step (S110) for acquiring second attribute information on the basis of the first user identification information, and the third step is a step (S111) for outputting the performance information on the basis of the first attribute information and the second attribute information.

Thus, the user can receive different unique performance services corresponding to combinations of the attribute of the kigurumi and the attributes of the characters held by the user, and as a result, the user can receive an even more special performance experience.

Appendix 9

The program according to any of appendices 1 to 8, wherein the kigurumi includes a stamp having a plurality of touch portions, and the first step is a step (S102) for acquiring the first identification information by detecting a plurality of contact locations of the touch portions of the stamp using a first user terminal having a touch screen that is capable of detecting individual contact locations when contacted in a plurality of locations.

Thus, through interaction involving more direct contact with the kigurumi 32, a specific user can be reliably provided with a performance experience. In the case of a non-contact communication method such as a wireless method, interaction with a kigurumi 32 that the user did not intend to interact with may be erroneously detected, and complicated advance settings are required to establish communication, and therefore a non-contact communication method is particularly suitable for events in which unspecified large numbers participate.

Appendix 10

The program according to any of appendices 1 to 9, wherein the third step is a step (S113) for outputting the performance information to a first user terminal including a display device, and the first user terminal controls the display content of the display device on the basis of the performance information.

Thus, the user can receive the performance service from their own user terminal.

Appendix 11

The program according to any of appendices 1 to 10, wherein the third step is a step (S114) for outputting the performance information to an information terminal provided on the kigurumi on the basis of the first identification information. Thus, the user can receive the performance service from the kigurumi 32, and as a result, the user can receive an even more special performance experience.

Appendix 12

The program according to any of appendices 1 to 11, wherein the program causes the processor to execute a ninth step for acquiring second identification information corresponding to a second kigurumi, and a tenth step for outputting performance information relating to the second kigurumi on the basis of a combination of the second identification information and the first user identification information, the kigurumi has a substantially identical shape to the second kigurumi, a type code included in the first identification information is equal to a type code included in the second identification information, and the performance information output in the third step differs from the performance information output in the tenth step.

Thus, even with regard to kigurumis 32 with identically shaped appearances, the user is provided with different performance services in accordance with the past interaction experience with the user. As a result, the user can receive an even more special performance experience.

Appendix 13

An information processing device including a processor and a storage unit, wherein the processor is caused to execute a first step (S102) for acquiring first identification information from a terminal provided on a kigurumi, a second step (S103) for acquiring first user identification information from a first user terminal, and a third step (S105) for outputting performance information relating to the kigurumi on the basis of the first identification information and the first user identification information, and a different value is set as the first identification information for each type of kigurumi or each individual kigurumi.

Appendix 14

An information processing method for causing a computer including a processor and a storage unit to execute information processing, wherein the information processing method causes the processor to execute a first step (S102) for acquiring first identification information from a terminal provided on a kigurumi, a second step (S103) for acquiring first user identification information from a first user terminal, and a third step (S105) for outputting performance information relating to the kigurumi on the basis of the first identification information and the first user identification information, and a different value is set as the first identification information for each type of kigurumi or each individual kigurumi.

The invention claimed is:

1. A non-transitory computer-readable storage medium storing computer-readable instructions thereon which, when executed on a computer, cause the computer to perform a method, the method comprising:

acquiring first identification information corresponding to a kigurumi;

acquiring first user identification information corresponding to a first user terminal;

acquiring a number of past acquisitions of the first identification information for each set of the first user identification information; and outputting performance information relating to the kigurumi based on the number of past acquisitions, the first identification information, and the first user identification information, wherein a different value is set as the first identification information for each of a plurality of kigurumis, wherein the performance information includes control information that controls a physical performance of the kigurumi.

2. The non-transitory computer-readable storage medium according to claim 1, further comprising:

acquiring the number of acquisitions of the first identification information within a predetermined period.

3. The non-transitory computer-readable storage medium according to claim 1, further comprising:

acquiring second identification information, which differs from the first identification information, from a second kigurumi; and outputting the performance information based on a combination of the first identification information and the second identification information.

4. The non-transitory computer-readable storage medium according to claim 3, further comprising:

outputting the performance information based on the first identification information and the second identification information in a case that an identification time and date of the first identification information and an identification time and date of the second identification information are within a predetermined period.

5. The non-transitory computer-readable storage medium according to claim 3, further comprising:

outputting different performance information based on the acquisition order of the first identification information and the second identification information.

6. The non-transitory computer-readable storage medium according to claim 1, further comprising:

acquiring rarity information relating to the kigurumi based on the first identification information; and outputting the performance information based on the rarity information.

7. The non-transitory computer-readable storage medium according to claim 1, further comprising:

acquiring first attribute information relating to the kigurumi based on the first identification information; and acquiring second attribute information based on the first user identification information; and outputting the performance information based on the first attribute information and the second attribute information.

8. The non-transitory computer-readable storage medium according to claim 1, wherein the kigurumi comprises a stamp having a plurality of touch portions, further comprising:

acquiring the first identification information by detecting a plurality of contact locations of the touch portions of the stamp using a first user terminal having a touch screen that detects individual contact locations in response to being contacted in a plurality of locations.

9. The non-transitory computer-readable storage medium according to claim 1, further comprising:

outputting the performance information to a first user terminal including a display device, wherein the first user terminal controls the display content of the display device based on the performance information.

10. The non-transitory computer-readable storage medium according to claim 1, further comprising:

outputting the performance information to an information terminal provided on the kigurumi based on the first identification information.

11. The non-transitory computer-readable storage medium according to claim 1, further comprising:

acquiring second identification information corresponding to a second kigurumi; and outputting performance information relating to the second kigurumi based on a combination of the second identification information and the first user identification information, wherein the kigurumi has a substantially identical shape to the second kigurumi, wherein a type code included in the first identification information is equal to a type code included in the second identification information, and wherein the performance information output relating the kigurumi differs from the performance information output relating to the second kigurumi.

12. An information processing device comprising a processor and a memory, wherein the processor is configured to:

acquire first identification information from a terminal provided on a kigurumi;

acquire first user identification information from a first user terminal;

acquire a number of past acquisitions of the first identification information for each set of the first user identification information; and output performance information relating to the kigurumi based on the number of past acquisitions, the first identification information, and the first user identification information, wherein a different value is set as the first identification information for each type of kigurumi or each individual kigurumi, wherein the performance information includes control information that controls a physical performance of the kigurumi.

13. An information processing method, comprising:

acquiring first identification information from a terminal provided on a kigurumi;

acquiring first user identification information from a first user terminal;

acquiring a number of past acquisitions of the first identification information for each set of the first user identification information; and outputting performance information relating to the kigurumi based on the number of past acquisitions, the first identification information, and the first user identification information, wherein a different value is set as the first identification information for each type of kigurumi or each individual kigurumi, wherein the performance information includes control information that controls a physical performance of the kigurumi.

14. The method of claim 13, further comprising:

acquiring the number of acquisitions of the first identification information within a predetermined period.

15. The method of claim 13, further comprising:

acquiring second identification information, which differs from the first identification information, from a second kigurumi; and outputting the performance information based on a combination of the first identification information and the second identification information.

16. The method of claim 15, further comprising:

outputting the performance information based on the first identification information and the second identification information in a case that an identification time and date of the first identification information and an identification time and date of the second identification information are within a predetermined period.

17. The method of claim 15, further comprising:

outputting different performance information based on the acquisition order of the first identification information and the second identification information.

18. The method of claim 13, further comprising:

acquiring rarity information relating to the kigurumi based on the first identification information; and outputting the performance information based on the rarity information.

* * * * *